(12) United States Patent
Owen et al.

(10) Patent No.: US 8,303,179 B2
(45) Date of Patent: Nov. 6, 2012

(54) TEMPERATURE-SENSING AND TRANSMITTING ASSEMBLIES, PROGRAMMABLE TEMPERATURE SENSOR UNITS, AND METHODS OF MAKING AND USING THEM

(75) Inventors: William H. Owen, Los Altos Hills, CA (US); Laurence Clifford, Saratoga, CA (US)

(73) Assignee: Precision Linear Systems, Inc., Cupertino, CA (US)

( * ) Notice: Subject to any disclaimer, the term of this patent is extended or adjusted under 35 U.S.C. 154(b) by 885 days.

(21) Appl. No.: 12/295,591

(22) PCT Filed: Jun. 2, 2007

(86) PCT No.: PCT/US2007/013129
§ 371 (c)(1),
(2), (4) Date: Sep. 30, 2008

(87) PCT Pub. No.: WO2007/143191
PCT Pub. Date: Dec. 13, 2007

(65) Prior Publication Data
US 2009/0141771 A1    Jun. 4, 2009

Related U.S. Application Data

(60) Provisional application No. 60/810,366, filed on Jun. 3, 2006.

(51) Int. Cl.
*G01K 7/00* (2006.01)
*G01K 7/01* (2006.01)
*G01K 1/08* (2006.01)

(52) U.S. Cl. .... 374/178; 374/179; 374/208; 374/E1.011

(58) Field of Classification Search ........... 374/178, 374/120, 170, 171, 172, 173, 179, 183, 185, 374/208, E1.011; 73/431, 866.5; 340/870.17
See application file for complete search history.

(56) References Cited

U.S. PATENT DOCUMENTS 3,405,225 A * 10/1968 McHugh, Jr. ................ 174/535
(Continued)

FOREIGN PATENT DOCUMENTS
GB      2132766 A * 7/1984
(Continued)

OTHER PUBLICATIONS

First Office Action from the Chinese Patent Office, mailed Jun. 23, 2010, in counterpart Chinese patent application 200780020558.4, with translation.

(Continued)

*Primary Examiner* — R. A. Smith
(74) *Attorney, Agent, or Firm* — Kilpatrick Townsend & Stockton LLP

(57) ABSTRACT

In an exemplary embodiment, a temperature sensor and a 4-20 mA transmitter on a single flexible circuit subassembly with a separate housing suitable for use in industrial control or HVAC applications. In a preferred embodiment, a narrow flex circuit substrate includes a silicon diode-based surface-mount sensor at a sensor end, a surface-mount programmable transmitter IC on a flex circuit substrate in the transmitter section, conductive traces connecting the sensor to the transmitter IC, and two conductive pads at an output end for connecting the 4-20 mA output to a pair of external wires. Additional traces on the flex subassembly are provided for testing and programming the transmitter IC and sensor. The sensor end of the flex subassembly is mounted in a metal sensor tube, filled and sealed in the same manner as RTD or thermistor sensors with leads are currently assembled for use in industrial control or HVAC applications.

34 Claims, 12 Drawing Sheets

U.S. PATENT DOCUMENTS

| | | | |
|---|---|---|---|
| 4,481,596 A * | 11/1984 | Townzen | 702/99 |
| 4,548,516 A | 10/1985 | Helenowski | |
| 4,587,719 A | 5/1986 | Barth | |
| 4,741,627 A * | 5/1988 | Fukui et al. | 374/208 |
| 4,955,380 A | 9/1990 | Edell | |
| 4,996,909 A * | 3/1991 | Vache et al. | 454/184 |
| 5,037,488 A | 8/1991 | Wienand | |
| 5,083,288 A * | 1/1992 | Somlyody et al. | 702/116 |
| 5,085,526 A | 2/1992 | Sawtell et al. | |
| 5,498,079 A * | 3/1996 | Price | 374/208 |
| 5,669,713 A * | 9/1997 | Schwartz et al. | 374/1 |
| 5,741,074 A | 4/1998 | Wang et al. | |
| 5,781,075 A * | 7/1998 | Bolton et al. | 331/176 |
| 6,190,040 B1 | 2/2001 | Renken et al. | |
| 6,345,238 B1 * | 2/2002 | Goodwin | 702/130 |
| 6,377,110 B1 | 4/2002 | Cooper | |
| 6,431,750 B1 | 8/2002 | Haberbusch et al. | |
| 6,588,931 B2 | 7/2003 | Betzner et al. | |
| 6,780,060 B1 | 8/2004 | Kajiura et al. | |
| 7,059,769 B1 | 6/2006 | Potega | |
| 7,507,023 B2 * | 3/2009 | Oyabe et al. | 374/178 |
| 7,625,117 B2 * | 12/2009 | Haslett et al. | 374/111 |
| 2003/0100821 A1 * | 5/2003 | Heller et al. | 600/347 |
| 2004/0086026 A1 | 5/2004 | Miki et al. | |
| 2005/0099163 A1 | 5/2005 | Liepold | |
| 2009/0013782 A1 * | 1/2009 | Theml et al. | 73/431 |
| 2009/0124220 A1 * | 5/2009 | Martensson | 455/128 |

FOREIGN PATENT DOCUMENTS

JP 2003262551 A * 9/2003

OTHER PUBLICATIONS

Search and Examination Reports from corresponding PCT Application No. PCT/US2007/013129 dated Sep. 15, 2008, 5 pages.

Minco, "Resistance Thermometry: Principles and applications of resistance thermometers and thermistors," Application Aid #18, Aug. 17, 2000, 12 pages, Minco.

ZMD AG, "ZMD31050 Advanced Differential Sensor Signal Conditioner," Preliminary Functional Description, Jun. 3, 2005, 44 pages, ZMD AG.

ZMD AG, "ZMD31050 Advanced Differential Sensor Signal Conditioner," Preliminary Datasheet, Sep. 16, 2005, 20 pages, ZMD AG.

* cited by examiner

TEMPERATURE-SENSING AND TRANSMITTING ASSEMBLIES, PROGRAMMABLE TEMPERATURE SENSOR UNITS, AND METHODS OF MAKING AND USING THEM

CROSS-REFERENCE TO RELATED APPLICATIONS

This application is a U.S. National Stage of PCT/US2007/13129 filed Jun. 2, 2007, which claims the benefit of U.S. Provisional Application Ser. No. 60/810,366 filed Jun. 3, 2006, the contents of which are incorporated herein by reference in their entirety.

RELATED APPLICATIONS

The present invention claims priority of U.S. Provisional Application Ser. No. 60/810,366, filed Jun. 3, 2006, the contents of which is incorporated herein by reference.

FIELD OF THE INVENTION

The inventions of the present application relate to programmable temperature sensor units, assemblies for programmable temperature sensor units, and methods of manufacturing and use thereof. Inventions of the present application can be particularly applied as programmable temperature sensor units for the industrial controls market, and for the heating, ventilation, and air-conditioning (HVAC) market, with preferred embodiments being housed in industry standard compliant housings and providing output signals in the form of currents for current-loop transmission protocol, and more preferably providing an industry standard 4 mA to 20 mA output current which is linear with the sensed temperature.

BACKGROUND OF THE INVENTION

Electronic temperature sensors and transmitters are used in industrial control and HVAC (Heating, Ventilation and Air Conditioning) applications to measure temperature and provide electrical signals to equipment to control temperature. The sensors in these applications are typically based on resistance temperature detectors (RTDs) or thermistors mounted in a metal tube attached to a connection head. The RTD or thermistor sensor has two or more insulated wires, which pass through the tube and connect to a terminal block or pigtail wires on a transmitter mounted in the connection head. The transmitter electrically biases the sensor, measures the sensor output, and generates an output that can be transmitted. A programmable transmitter can be programmed by the user in the field to generate an output for a specific sensor temperature range for the user's application. One of the most commonly used transmitter outputs is a 4 mA to 20 mA current loop. This current loop output is used to connect the transmitter to controlling equipment that may be located a long distance away without losing accuracy due to resistance in the connecting line. The length and diameter of the sensor tube varies depending on the temperature measurement needs of the application. Many industrial temperature probes use a connection head that holds an industry standard DIN Form B transmitter housing. Many HVAC applications use a connection head that holds a miniature transmitter housing.

SUMMARY OF THE INVENTION

As part of making their invention, the inventors have recognized that the prior art programmable temperature sensor-transmitter arrangements are expensive and require assembly in the field (e.g., connection of the temperature sensor to the transmitter with pigtail-type connections, screw connections, etc.). The expense arises from the fact that the temperature sensors must meet stringent electrical characteristics that are set by industry standard, and must be laser-trimmed during the manufacturing process to meet the standard. The laser-trimming process is expensive and time-consuming. In addition, some of the temperature sensors will not meet the standard even after the laser-trimming process and must be discarded. This leads to lower yield and increased costs for the sensors that do meet the standard. In a similar manner, the transmitters must also meet a corresponding industry standard that leads to lower yield and increased costs. The inventors have addressed these problems by inventing a programmable temperature-sensing and transmitting assembly that comprises a temperature sensor and programmable transmitter mounted to a common flexible circuit substrate, optionally with additional components. The temperature sensor provides the programmable transmitter with an electrical signal that is representative of the temperature that it senses, and the programmable transmitter generates therefrom an output electrical signal that is representative of the sensed temperature, but which is substantially more linear with respect to temperature than the output signal of the temperature sensor. The programmable transmitter provides a mapping between the input signal received from the temperature sensor and its output signal, and comprises circuitry that implements the mapping. The mapping circuitry is programmable to provide flexibility in the mapping of the sensor's output signal to the transmitter's output signal. After the temperature sensor and transmitter are mounted to the common flexible circuit substrate, the transmitter is set with a known mapping, the assembly is exposed to a plurality of known temperatures, and the output of the transmitter is measured at the known temperatures. The measured results are then examined, and a new mapping is generated which provides a substantially linear relationship between the transmitter's output signal and temperature, and the new mapping is programmed into the mapping circuitry of the transmitter. The measured results can be stored in an EEPROM and can be used to program the transmitter in the final application (e.g., in the field) to provide a substantially linear relationship between the transmitter's output signal and a specific sensor temperature range needed by the final application. The measuring and programming step compensates for the inaccuracies and non-linearities present in the temperature sensor, the transmitter (e.g., an analog-to-digital converter or voltage reference in the transmitter), and any components coupled to the output of the transmitter (e.g. a sense-loop resistor). Accordingly, the temperature sensor and programmable transmitter may comprise inexpensive non-precision components, thereby reducing costs. Additionally, the assembly, measurement, and initial programming steps can all occur in a factory environment, and further on a manufacturing assembly line, thereby further reducing cost with volume manufacturing. In this regard, multiple assemblies may be formed on a common sheet of flexible circuit material, tested and programmed, and thereafter separated from one another to further reduce manufacturing costs. The flexible circuit substrate then enables the programmed assembly to be easily inserted into a separate temperature sensor housing without the need to make connections in the field.

Broadly stated, a first set of inventions of the present application encompasses a temperature-sensing and programmable transmitting assembly that comprises a flexible circuit substrate, a temperature sensor, and a programmable transmitter. The flexible circuit substrate comprises a polymer sheet having a first area and a second area, a first plurality of interconnect pads disposed in the first area for electrically coupling to at least the temperature sensor, a second plurality of interconnect pads disposed in the second area for electrically coupling to at least the programmable transmitter, and a first electrical trace extending from at least one of the first plurality of interconnect pads to the second plurality of interconnect pads. The temperature sensor is mounted to at least one of the first plurality of interconnect pads and is electrically coupled to at least the first electrical trace. The temperature sensor is adapted to sense temperature and generate an output signal representative of the temperature around it (herein simply referred to as "the sensed temperature"). The programmable transmitter is mounted to at least a plurality of the second plurality of interconnect pads and is electrically coupled to at least the first electrical trace. The programmable transmitter has an input to receive a signal representative of the sensed temperature, and an output to provide an output signal representative of the sensed temperature. In preferred embodiments, the programmable transmitter comprises a programmable mapping circuitry that provides a flexible mapping between its input temperature signal and its output temperature signal, which in preferred embodiments can be programmed by the user in the field to an arbitrary sensor temperature range.

Further broadly stated, a second set of inventions of the present application encompasses a temperature-sensor unit that comprises a housing having at least one aperture, and a temperature-sensing and programmable transmitting assembly according to the first set of inventions of the present application. A first portion of the temperature-sensing and programmable transmitting assembly is disposed in the housing and a second portion is disposed through the at least one aperture, with the temperature sensor of the assembly being disposed outside of the housing.

Further broadly stated, a third set of inventions of the present application encompasses a method of making a temperature-sensing and programmable transmitting assembly, the method comprising receiving a flexible-circuit substrate having a first area with a first plurality of interconnect pads disposed therein and a second area with a second plurality of interconnect pads disposed therein, mounting a temperature sensor to the first area of the flexible-circuit substrate, and mounting a programmable transmitter to the second area of the flexible-circuit substrate.

Further broadly stated, a fourth set of inventions of the present application encompasses a method of setting a temperature-sensing and programmable transmitting assembly that is in accordance with the first set of inventions of the present application, and that includes a transmitter having a programmable mapping circuitry that provides a flexible mapping between the transmitter's input temperature signal and the transmitter's output temperature signal. The method comprises exposing at least the temperature sensor of the assembly to a plurality of different temperatures with the programmable transmitter having a known first mapping in its mapping circuitry, and measuring the values of the programmable transmitter's output signal at the plurality of different temperatures. The method further comprises generating a second mapping from the measured values and different temperatures that provides a substantially linear relationship between the temperature sensed by the temperature sensor and the output signal of the transmitter circuit. The method further comprises programming the mapping circuitry of the transmitter with the second mapping. Preferred embodiments of the method further comprise saving the measured values of the programmable transmitter such that additional mapping values for different sensor temperature ranges can be programmed into the mapping circuitry of the programmable transmitter.

Further broadly stated, a fifth set of inventions of the present application encompasses a method of making a temperature sensor unit. The method broadly comprises disposing a first portion of a temperature-sensing and programmable transmitting assembly that is in accordance with the first set of inventions of the present application within a housing such that a second portion of the assembly passes through an aperture of the housing and such that the temperature sensor of the assembly is disposed outside of the housing. The first portion of the assembly has the programmable transmitter.

Accordingly, it is an object of one or more inventions of the present application to enable the manufacturing of low-cost electronic temperature sensor units.

It is yet another object of one or more inventions of the present application to enable the provision of electronic temperature sensor units which do not require manually connecting temperature sensor wires to a transmitter unit.

It is yet another object of one or more inventions of the present application to enable the provision of electronic temperature sensor units that provide output signals suitable for use in current-loop transmission protocols, with the output currents preferably ranging from 4 mA to 20 mA as a substantially linear function of sensed temperature.

It is yet another object of one or more inventions of the present application to enable the provision of an electronic temperature sensor and transmitter assembled on a flexible circuit substrate as an assembly, wherein the assembly can be mounted in a separate transmitter housing that is dimensionally consistent and compatible with an existing industry standard.

These and other objects of the present inventions will become apparent to those skilled in the art from the following detailed description of the invention, the accompanying drawings, and the appended claims.

DETAILED DESCRIPTION OF THE INVENTION

In the following description, numerous specific details are set forth to provide a more thorough description of the specific embodiments of the inventions. It is apparent, however, that the invention may be practiced without all the specific details given below. In other instances, well known features have not been described in detail so as not to obscure the inventions.

Figure 1:
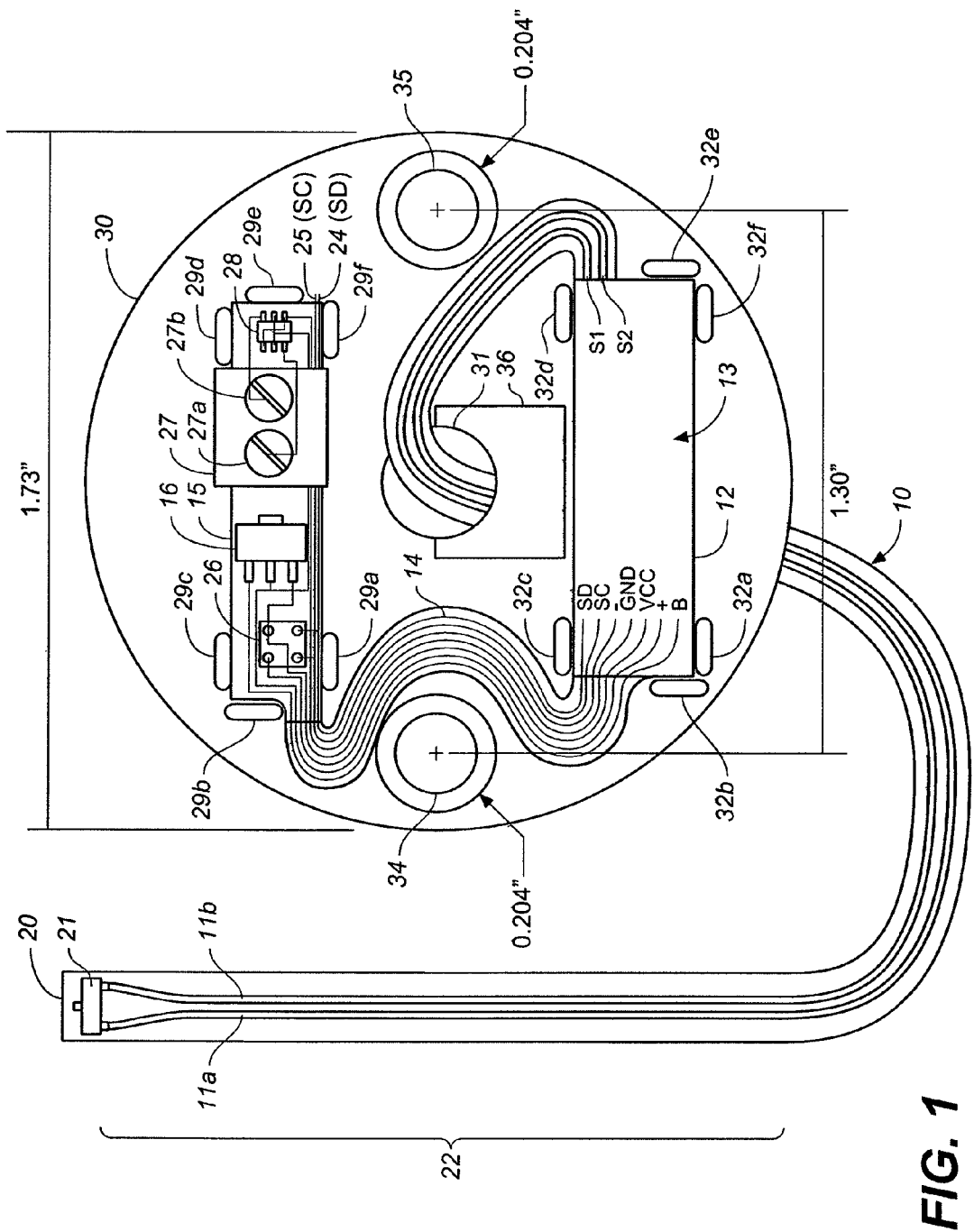
FIG. 1 is a plan view of an exemplary programmable temperature sensor unit comprising a temperature sensor, programmable transmitter section and output section disposed on a flexible circuit substrate, with the programmable transmitter and output sections mounted in a DIN Form B compatible housing according to at least one of the present inventions.
Figure 1A:
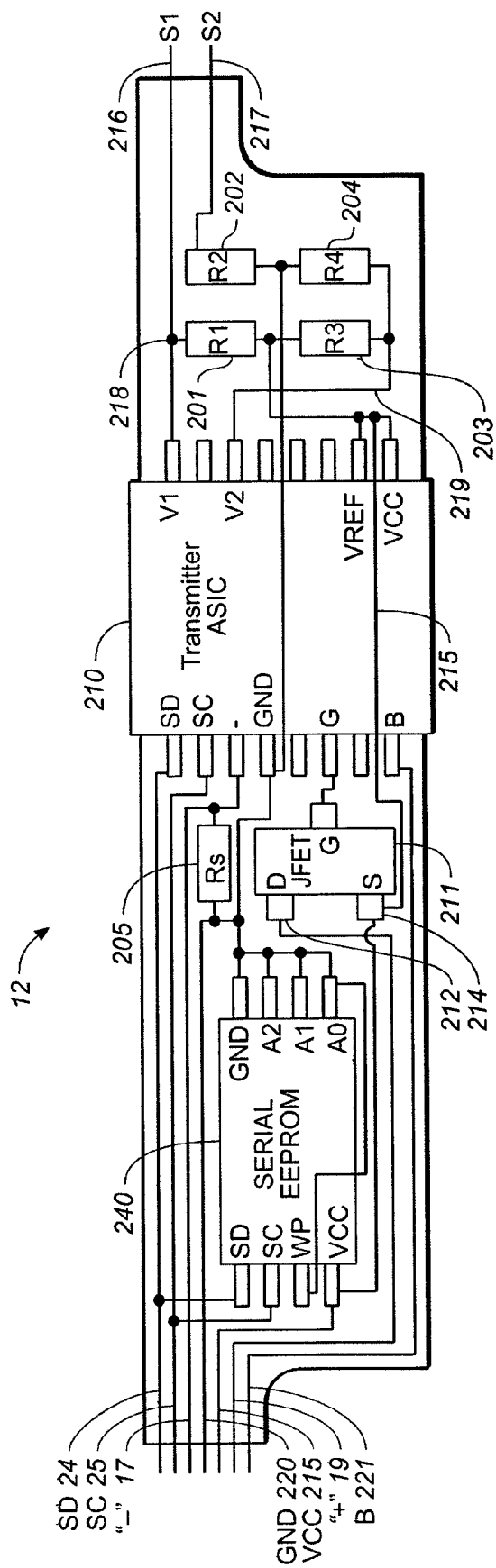
FIG. 1A is a plan view of the section on the flexible circuit substrate that holds the programmable transmitter circuitry of the programmable temperature sensor unit according to at least one of the present inventions.
Figure 1B:
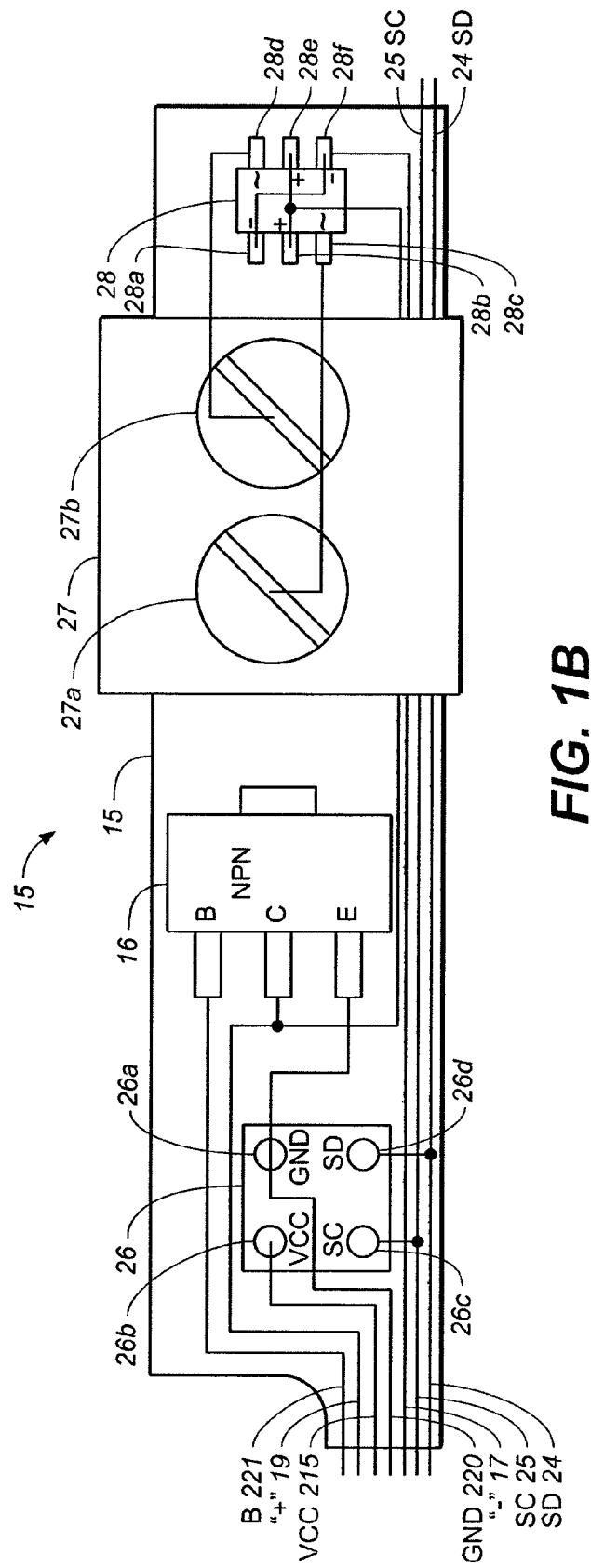
FIG. 1B is a plan view of the section on the flexible circuit substrate that holds the output components and programming jack of the temperature sensor unit according to at least one of the present inventions.

Referring now to the Drawings, FIG. 1 depicts a temperature-sensing and transmitting assembly 10 and a DIN Form B compatible housing 30 suitable for use in industrial control temperature sensing applications. Assembly 10 comprises a flexible circuit substrate and a number of components (as described below) attached thereto at a plurality of interconnect pads. The flexible circuit substrate comprises a polymer sheet, and a plurality of electrical traces and interconnect pads formed on one surface, and preferably both the top and bottom surfaces, of the polymer sheet. Assembly 10 comprises the following sections: a sensor-probe section 22, which abuts the left side of a transmitter section 12, an output section 15, and interconnecting section 14 which spans between the left side of the transmitter section 12 and the output section 15. Sections 12 and 15, and the connections between them provided by section 14, provide a programmable transmitter. In the view shown in FIG. 1, the back surface 13 of the transmitter section 12 is shown. Various components are attached to the front surface of transmitter section 12, and a detailed view of the front surface is shown in FIG. 1A and described in greater detail below. A detailed view of the output section 15 is shown in FIG. 1B and described in greater detail below.

Figure 6:
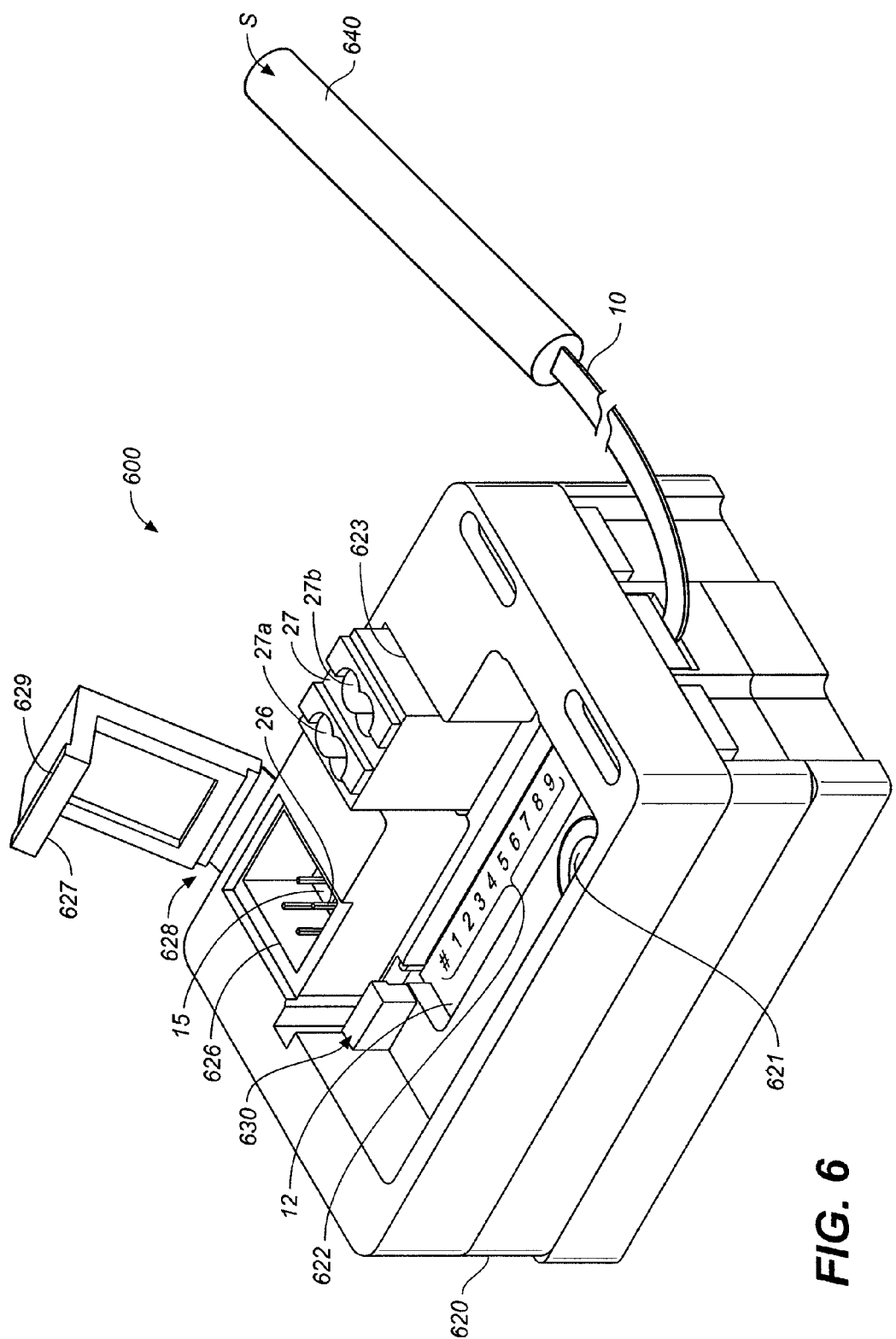
FIG. 6 is a three-dimensional view of a flexible temperature-sensing and programmable transmitting circuit assembly mounted in a miniature transmitter housing according to at least one of the present inventions.

A surface-mount temperature sensor 21 is mounted on the sensor end 20 of assembly 10 and connected to conductive traces 11a and 11b on assembly 10. The sensor-probe section 22 of assembly 10 is made narrow enough, typically less than 0.15", to allow it to be inserted into a metal sensor tube (shown at 340 in FIG. 3) with an outside diameter of at least 3/16". The sensor-probe section 22 of assembly 10 may be made in various lengths from a few inches to several feet to accommodate sensor tubes of different lengths as needed for industrial control applications. As seen in FIG. 1, a portion of assembly 10 runs through entrance aperture 31 of housing 30. An access door 36 that is approximately 0.4"×0.5" can be opened to allow assembly 10 to be threaded through the entrance aperture 31 after the sensor end 20 is mounted in a sensor tube (not shown) and attached to a connection head (not shown). After assembly 10 is routed through the entrance aperture 31 the access door 36 is closed to provide a finished entrance aperture diameter of 0.280" which complies with the DIN Form B specification. Conductive traces 11a and 11b electrically connect sensor 21 to inputs S1 and S2 (shown in FIGS. 2, 2A-2C) on the programmable transmitter section 12 of the flex circuit assembly 10. The transmitter section 12 is secured in housing 30 by guides 32a, 32b, 32c, 32d, 32e, and 32f. The interconnecting section 14 of assembly 10 between programmable transmitter section 12 and output section 15 has 7 conductive traces that connect signals B, "+", VCC, GND, "−", SC and SD between the programmable transmitter circuit 12 and output section 15. Interconnecting section 14 is routed around mounting holes 34 and 35 to allow the output section 15 to be positioned in the upper portion of housing 30. The output section 15 is secured in housing 30 by guides 29a, 29b, 29c, 29d, 29e, and 29f. The components in output section 15 include a programming jack 26, power transistor 16, a two-connector terminal block 27 (also called a "two-position" terminal block in the art), a bridge rectifier 28, and serial interface traces SC 25 and SD 24 to provide connections to an external serial communication bus. These components are shown in greater detail in FIG. 1B, where an exemplary embodiment of bridge rectifier 28 has six pins 28a-28f with four rectifiers disposed among the pins. Terminal block 27 may comprise screw terminals 27a and 27a, which are shown in FIG. 1, for may comprise spring-force terminals 27a and 27b, which are shown in FIGS. 3 and 6. Each spring force terminal comprises an electrically-conductive coiled spring, in to which a wire may be inserted to expand the coil's radius, which causes the coil to exert an inward force that grips and holds the inserted wire. The spring force terminal enables faster connections to terminal block 27 than the screw terminals. The spring force terminal is also better at maintaining an electrical connection in heavy vibration environments compared to other screw-type terminals.

Once the programmable transmitter section 12 and output section 15 are placed and secured in housing 30, any extra length (unneeded length) of assembly 10 between the sensor section 20 (i.e., sensor-probe section 22) and the programmable transmitter section 12 can be placed inside housing 30. The housing top (shown in FIG. 4) is placed on housing 30 and bolted into a DIN Form B compatible connection head (not shown) to complete an assembly which matches the form, fit and function of existing temperature sensor and transmitter assemblies used in various industrial control applications. The DIN Form B specification for the outside diameter of housing 30 is 1.732". DIN Form B specification for the diameter of mounting holes 34 and 35 is 0.204", and the center-to-center distance between holes 34 and 35 is 1.300". In preferred embodiments, except for the terminal block 27, all the components in this design are in surface-mount packages to facilitate fast, low-cost, automated assembly.

Figure 2:
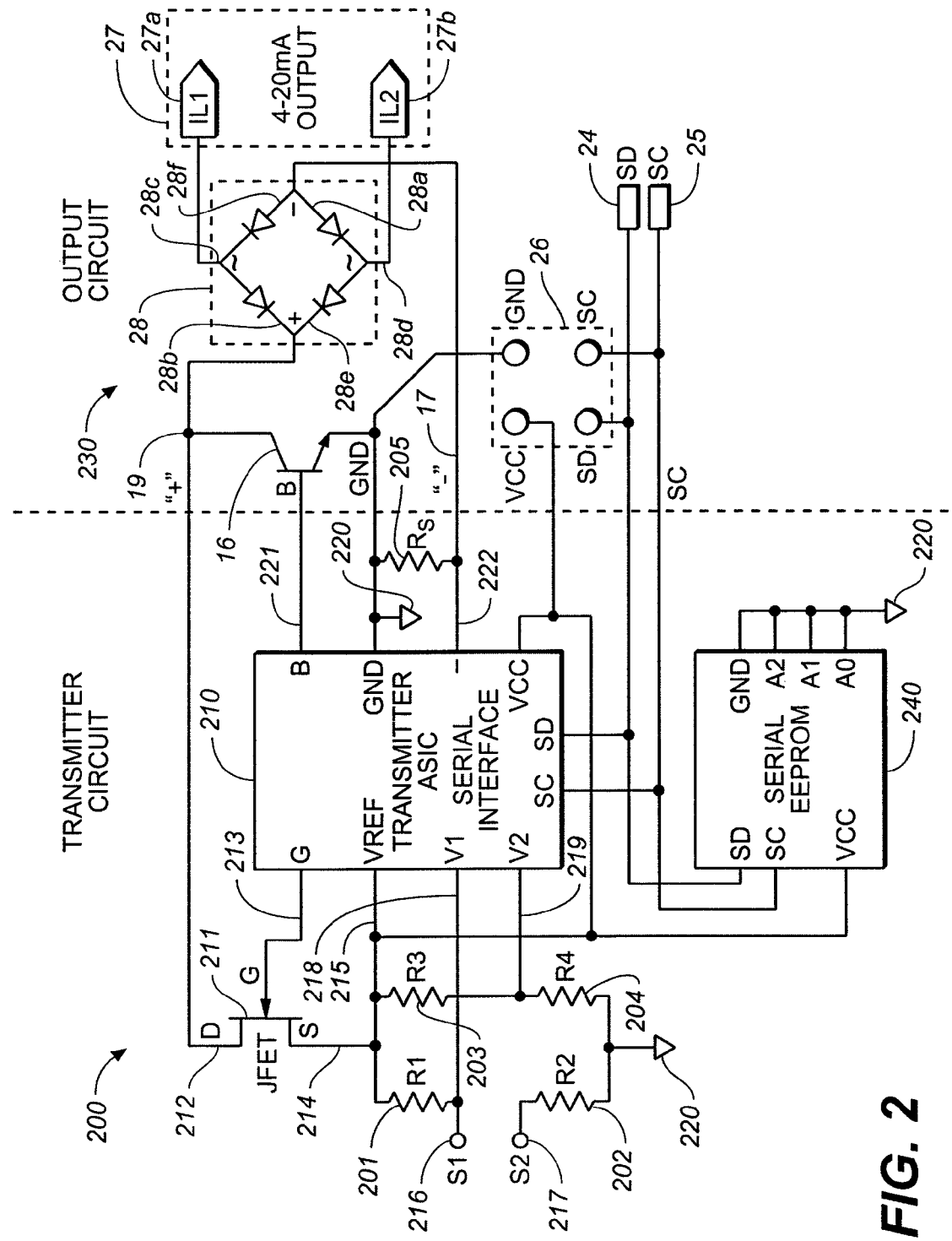
FIG. 2 is a schematic representation of exemplary circuits in the programmable transmitter section and output section according to at least one of the present inventions.
Figure 3:
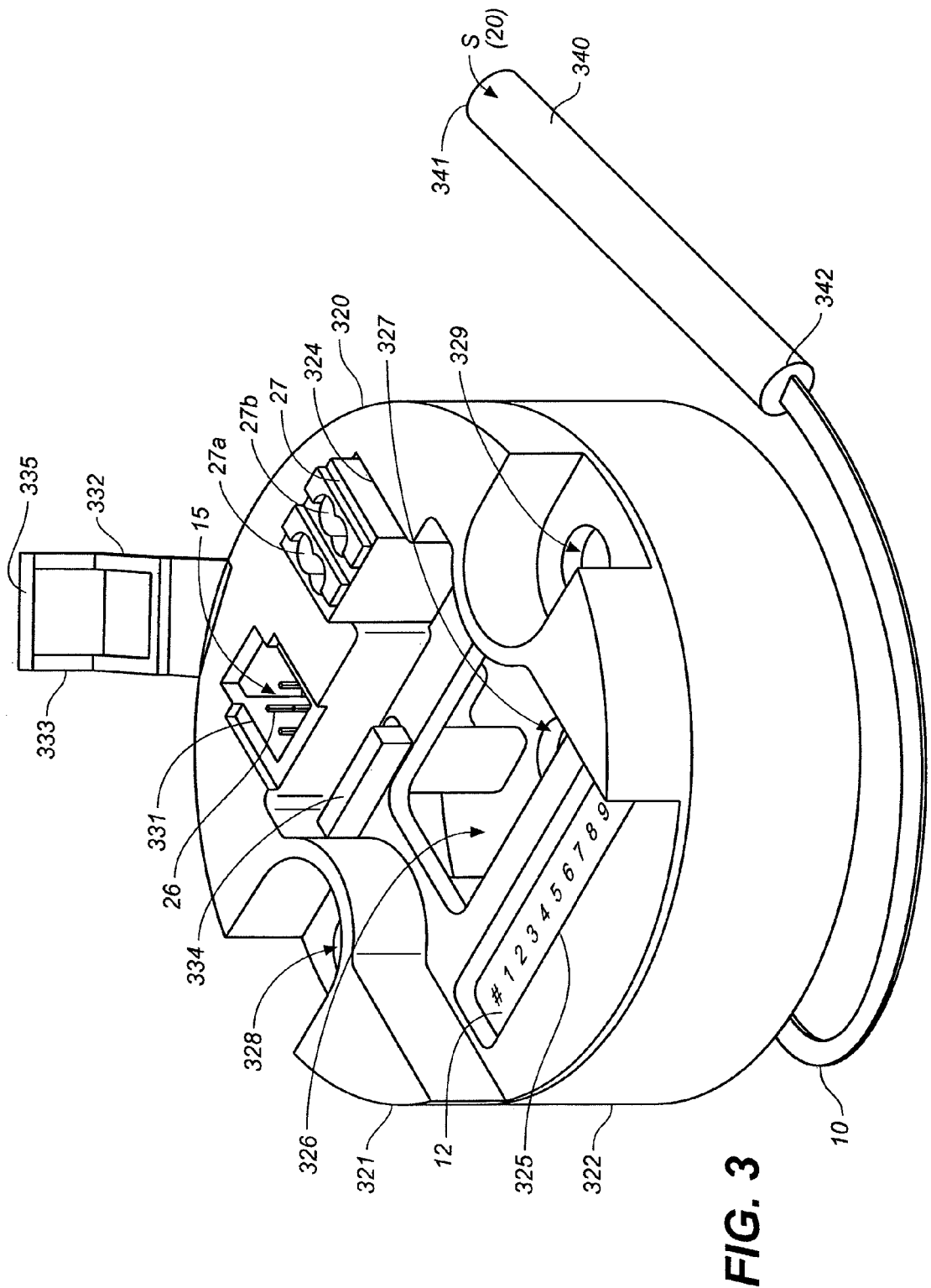
FIG. 3 is a three-dimensional view of an exemplary flexible temperature-sensing and programmable transmitting circuit assembly mounted in a sensor tube and a DIN Form B compatible transmitter housing according to at least one of the present inventions.

FIG. 2 shows a schematic representation for a transmitter circuit 200 that is located in the programmable transmitter section 12 of assembly 10 (FIG. 1), and an output circuit 230 that is located on output section 15 of assembly 10. (Circuits 200 and 230 collectively provide a programmable transmitter.) Transmitter circuit 200 includes a programmable transmitter chip 210, a serial EEPROM 240, JFET transistor 211, sensor bias resistors 201 and 202, divider resistors 203 and 204, and a current sense resistor 205. Output circuit 230 includes a four-connector programming jack 26 (also called a "four-position" programming jack in the art), a medium power NPN transistor 16, a two-connector terminal block 27, and a bridge rectifier 28. Small traces 24 and 25 provide connections to the serial interface signals SD and SC, respectively, of transmitter chip 210 and serial EEPROM 240. Transmitter chip 210 may be implemented by the commercially available ZMD31050 Advanced Differential Sensor Signal Conditioner manufactured by the ZMD AG Corporation. The ZMD31050 is an application-specific integrated circuit (ASIC) that has a differential input to receive a differential input signal at pins V1 and V2, an output to provide an output signal at pin B that can be configured to generate a current signal that varies in relation to the input signal and that ranges between 4 mA and 20 mA. Mapping circuitry generates the output signal based on the input signal and a mapping. The mapping can be viewed as a mathematical function which generates an output value for each input value. The mathematical function is defined by a plurality of parameters, which can be nonvolatily programmed into the mapping circuitry of transmitter chip 210. An exemplary mathematical mapping function may take the form of a third-degree polynomial having the form:

$$\text{Output Signal} = A_0 + A_1*(\text{Input Signal}) + A_2*(\text{Input Signal})^2 + A_3*(\text{Input Signal})^3 \quad [1]$$

where $A_0$, $A_1$, $A_2$, and $A_3$ are numerical coefficients, representations of which can be nonvolatily stored in the mapping circuitry of transmitter chip 210.

In operation, an external 4 mA to 20 mA current loop is connected to the IL1 and IL2 terminals 27a and 27b, respectively, to provide power to the circuit. The current loop voltage typically ranges from 10 to 30 volts. Terminals 27a (IL1) and 27b (IL2) are connected to the AC nodes 28c and 28d, respectively, of bridge rectifier 28 in output circuit 230 (shown in FIG. 1B and FIG. 2). This allows the current loop voltage to be connected in either polarity to terminals 27a (IL1) and 27b (IL2). The "+" outputs of bridge rectifier 28 at pins 28b and 28e are connected to the "+" trace 19 of flexible circuit 10, which applies positive voltage to the drain 212 of JFET transistor 211 (shown in FIG. 1A and FIG. 2). The "−" outputs of bridge rectifier 28 at pins 28a and 28f are connected to the "−" trace 17 of flexible circuit 10, which provides the return path for current powering the circuit. JFET transistor 211 is a depletion N-FET which is ON when the voltage on the gate node 213 is initially at 0 volts. When positive voltage is applied to the drain 212, the source 214 of JFET transistor 211 rises until the depletion threshold, Vtd, is reached. This biases the Vref node 215 up to about +2V and starts up transmitter chip 210's internal Vref circuitry. Transmitter chip 210 then controls the voltage on gate node 213 to provide a well-regulated Vref supply in the 3 volt to 5 volt range on node 215. Vref node 215 is connected to sensor bias resistor 201 to provide current to sensor terminal S1 at 216. Sensor bias resistor 202 is connected to sensor terminal S2 and provides a current path from the sensor to a ground 220. (Ground 220 is set at the GND terminal of transmitter chip 210, at the high potential side of sense resistor 205.) Sensor bias resistors 201 and 202 are selected to bias the chosen temperature sensor device (e.g., sensor 21 in FIG. 1) such that the voltage on node 216 is in a reasonable operating range for the differential input V1 at node 218 of transmitter chip 210. Divider resistor 203 is connected between Vref node 215 and differential input V2 at node 219. Divider resistor 204 is connected between V2 node 219 and ground 220. Divider resistor values are selected to provide a voltage on node 219 that is approximately midway between the minimum and maximum voltages on input V1 as the temperature sensor varies from the highest to the lowest temperature in the range of sensed temperatures in which assembly 10 is intended to operate. Transmitter chip 210 amplifies the differential voltage input on V1 and V2 and converts it to a digital value. Transmitter chip 210 also performs offset, first-order, second-order, and third-order linearization corrections according to equation [1] above, and based on coefficients $A_0$-$A_3$ stored in a nonvolatile memory, and outputs a voltage on node 221 (terminal B of the chip) to drive the base of NPN transistor 16. Note that some of the loop current flows through JFET transistor 211 to power up chip 210 and bias resistors 201 and 203, while the remainder of the loop current flows through NPN transistor 16, which is controlled by chip 210's output circuitry. Since all the loop current from the "+" trace 19 to the "−" trace 17 has to flow through sense resistor ($R_S$) 205, an accurate measurement of the total loop current is possible by measuring the voltage across sense resistor 205. Chip 210's "−" terminal 222 is a high impedance sense input which is connected to both the "−" input trace 17 and to one terminal of sense resistor 205. The other terminal of sense resistor 205 is connected to ground 220. So chip 210's output circuitry uses the voltage between nodes 220 and 222 (i.e., the voltage across sense resistor 205) to accurately sense the total loop current and control the base drive voltage on node 221 (terminal B of chip 210) to achieve a total loop current that is in relation to the sensed temperature (sensor input).

The serial interface signals SD 24 and SC 25 are connected to a test system capable of communicating with transmitter chip 210 and serial EEPROM 240. The test system exposes temperature sensor 21 to several different temperatures, measures the current output of transmitter chip 210, and computes a set of coefficients $A_0$, $A_1$, $A_2$, and $A_3$ such that the transmitter 210's current output signal will be substantially linear with temperature. When all the measurements are made and coefficients computed, the test system issues commands by way of serial interface signal SD 24 and SC 25 to store the coefficients in a nonvolatile memory in transmitter chip 210. This process can be actually more complex than this, and a detailed exampled is provided below. In that example, the test system is able to read raw measured values, and there is no need to present chip 210 with initial values for many of the components. In implementations where the test system cannot access raw measured value, an initial set of coefficients must either be set (preferred) or read from chip 210. This provides a first mapping of the output of temperature sensor 21 to the output of transmitter 210, which enables the output of temperature sensor 21 at the various test temperatures to be computed. The initial set of coefficients may be denoted as $A_{0,I}, A_{1,I}, A_{2,I},$ and $A_{3,I}$. In general, initial coefficients $A_{2,I}$ and $A_{3,I}$ are set to zero, and coefficients $A_{0,I}$ and $A_{1,I}$ are set with values that are estimated to generally map the full range of the input (which is the output of temperature sensor 21) to be within a major fraction of the range of the output (which is the output of chip 210). This effectively enables the output of temperature sensor 21 to be measured with high resolution. From the measured output values at the known test temperatures, and from the initial mapping provided by initial coefficients $A_{0,I}$-$A_{3,I}$, a set of coefficients that provide a substantially linear relationship between sensed temperature and output current can be computed. That set of coefficients is denoted as $A_{0,C}$, $A_{1,C}$, $A_{2,C}$, and $A_{3,C}$.

While polynomial correction has been illustrated above, it may be appreciated that transmitter chip 210 may use one or more programmable look-up tables from which output values may be interpolated from the input values.

Since transmitter chip 210 is used to correct for offset and nonlinearity, a non-precision, non-calibrated device may be used for the temperature sensor 21. This enables very low-cost, readily-available silicon diodes in a surface mount package to be used for the sensing device instead of a more expensive laser-trimmed RTD (resistance temperature device) or thermistor. (For high temperature applications, gallium-arsenide junction diodes may be used.) The use of a semiconductor-junction diode also allows the use of much simpler bias circuitry for the temperature sensor—in this case just a resistor 201 connected to Vref Although such a simple bias circuit causes the current to change as the sensor voltage changes, which makes the sensor output slightly more nonlinear, this nonlinearity is combined with the nonlinearity of the sensor and both are corrected during the test using second-order and third-order corrections (e.g., using the non-zero value of $A_{2,C}$ and $A_{3,C}$). Since the sensor device and transmitter are permanently mounted on the same assembly 10 prior to testing, both the transmitter and sensor nonlinearities are corrected together at the time of testing. This significantly improves the accuracy of the temperature measurement of the combined system compared to the prior art method of using separately calibrated or trimmed sensors and transmitters.

FIG. 1A shows where the programmable transmitter components illustrated in FIG. 2 are generally placed on the front surface of the programmable transmitter section 12 of assembly 10, which is shown in FIG. 1. These components are preferably attached to interconnect pads located on the front surface of the transmitter section with solder. Also shown in FIG. 1A are programmable transmitter section 12 signals SD, SC, "−", GND, VCC, "+" and B, which are connected to interconnecting section 14 traces 24, 25, 17, 220, 215, 19, and 221, respectively.

FIG. 1B shows in more detail where the output section components illustrated in FIG. 2 are generally placed in the output section 15 of assembly 10, which is shown in FIG. 1. Programming jack 26 has four pins (also referred to as "four positions"), 26a, 26b, 26c, and 26d, which are connected to traces 220, 215, 25, and 24, respectively, and which in turn connect to signals GND, "VCC", SC and SD, respectively. NPN transistor 16 has B, C, and E pins, which are connected to traces 221, 19, and 220, respectively, which in turn connect to signals B, "+", and GND, respectively. Detailed descriptions of the terminal block 27 and bridge rectifier 28 connections in the output section 15 were provided earlier in this specification.

Figure 2A:
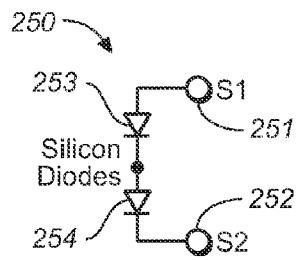
FIG. 2A is a schematic representation of an exemplary temperature sensor having two serially-connected semiconductor (e.g., silicon) diodes according to at least one of the present inventions.

FIG. 2A shows a schematic diagram of an exemplary temperature sensor 250 suitable for use as temperature sensor 21. Temperature sensor 250 comprises two serially-coupled silicon diodes. The anode of a first diode 253 is connected to terminal 251 (terminal S1), the cathode of first diode 253 and the anode of a second diode 254 are coupled together, and the cathode of second diode 254 is coupled to terminal 252 (terminal S2). Terminals 251 (S1) and 252 (S2) are coupled to the transmitter circuit 200 terminals 216 (S1) and 217 (S2), respectively, which are shown in FIG. 2. Two diodes in series are chosen to provide a reasonably large change in output voltage with temperature of about 4 mV per degree Celsius, and also to raise the voltage at terminal 216 (S1) above 0.8V at high temperature to prevent the input differential amplifier of transmitter chip 210 from bottoming out (i.e., to prevent its output from saturating). In this configuration, resistor 202 (R2) can be removed and transmitter input S2 (terminal 217) can be connected directly to ground 220 in FIG. 2. This applies the full diode voltage change with temperature signal to the chip 210's input terminal V1, (terminal 218) and also eliminates one surface mount component from the transmitter circuit.

Figure 2B:
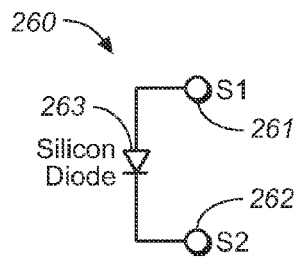
FIG. 2B is a schematic representation of an exemplary temperature sensor having one semiconductor (e.g., silicon) diode according to at least one of the present inventions.

FIG. 2B shows the schematic diagram of another exemplary temperature sensor 260 suitable for use as temperature sensor 21. Exemplary temperature sensor 260 comprises a single silicon diode 263. The anode of diode 263 is coupled to terminal 261 (terminal S1), and the cathode of diode 263 is coupled to terminal 262 (terminal S2). Terminals 261 (S1) and 262 (S2) are coupled to the transmitter circuit 200's terminals 216 (S1) and 217 (S2), respectively, shown in FIG. 2. At a high temperature such as 150 degrees Celsius, the forward voltage of a silicon diode 263 is about 0.4V, which may be too low for the differential input terminal V2 (219) of transmitter chip 210 (shown in FIG. 2). In this case, bias resistor 202 (R2) in FIG. 2 needs to be adjusted to raise the lowest level on terminal V2 (219) above the minimum operating input level, such as 0.8V, for example.

Figure 2C:
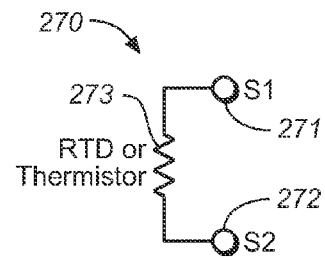
FIG. 2C is a schematic representation of an exemplary temperature sensor having a resistance temperature detector (RTD) or a thermistor according to at least one of the present inventions.

FIG. 2C shows a schematic of another exemplary temperature sensor 270 suitable for use as temperature sensor 21. Temperature sensor 270 comprises a resistance temperature detector (RTD) or a thermistor. An RTD is a resistor that changes resistance almost linearly with temperature in a well-known, stable manner. A thermistor is a resistor that changes resistance over several orders of magnitude as the temperature changes. Both types of sensors appear schematically as simply a resistor 273 coupled to terminals 271 (S1) and 272 (S2), which are coupled to the transmitter circuit 200's terminals 216 (S1) and 217 (S2), respectively, shown in FIG. 2.

The bias resistors 201 (R1) and 202 (R2), as well as the offset ($A_{0,C}$), gain ($A_{1,C}$), and higher-order correction factors ($A_{2,C}$ and $A_{3,C}$) in transmitter chip 210 (shown in FIG. 2) are adjusted to work properly with a given sensor for a given temperature range.

Figure 2D:
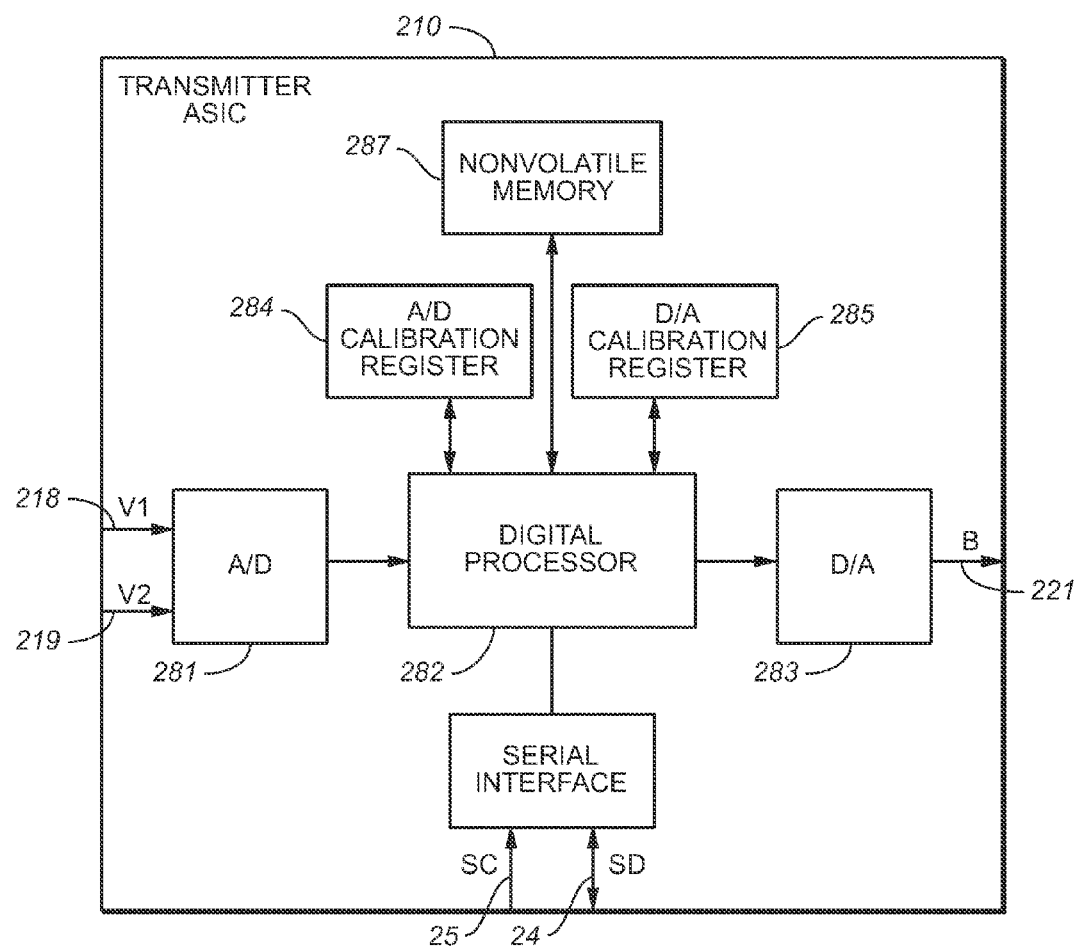
FIG. 2D is a block diagram of exemplary circuitry for a programmable transmitter according to at least one of the present inventions.

Exemplary calibrating and setting procedure. Referring to FIG. 2D, transmitter chip 210 uses an analog-to-digital (A/D) converter 281 to convert the analog sensor voltage inputs V1 (218) and V2 (219) to a digital input number. A digital processor 282 with preprogrammed A/D conditioning equations uses A/D calibration coefficients in A/D calibration register 284 to perform a digital correction to the digital input number for offset, slope, second-order nonlinearity, and third-order non-linearity, to produce a corrected digital temperature number. The digital temperature number will ultimately be converted to an analog current signal by a digital-to-analog (D/A) converter 283. However, before that, the corrected digital temperature number is further digitally conditioned by digital processor 282 with preprogrammed D/A conditioning equations using D/A calibration coefficients stored in D/A calibration register 285 to produce an output digital number. The D/A calibration coefficients are used to calibrate the D/A output B (terminal 221) which drives the 4 mA-20 mA output circuit 230 (shown in FIG. 2) and to perform first-order and second-order correction for D/A output variation with the temperature of transmitter chip 210 (with the use of an on-chip temperature sensor). These corrections will compensate for any offsets and nonlinearities in the characteristics of chip 210, its reference voltage and D/A converter 283, and sense resistor 205 (shown in FIG. 2).

To determine the A/D calibration coefficients, the sensor section 22 of the flex assembly 10 is preferably placed in a well-controlled, known (accurate) temperature environment and the digital input number is read using the serial interface 286 by a tester connected to serial interface signals SD and SC on terminals 24 and 25, respectively. A first sensor temperature, preferably near the midpoint of the full temperature measurement range, is used to measure a midpoint digital input number, which can be used to determine the offset A/D calibration coefficient. A second sensor temperature, preferably at one end of the full temperature measurement range, is used to measure a first endpoint digital input number, which can be used to determine the slope A/D calibration coefficient. If second-order A/D correction is desired, a third sensor temperature, preferably at the other end (opposite end) of the full temperature measurement range, is used to measure a second endpoint digital input number, which is used to determine the second-order A/D calibration coefficient. If third-order A/D correction is desired, a fourth sensor temperature, preferably midway between the first sensor temperature and either the second or third sensor temperatures, is used to measure an intermediate digital input number, which is used to determine the third-order A/D calibration coefficient. After all the needed digital input numbers are measured, the test software uses a fitting algorithm (e.g., a least-squares fitting algorithm) to calculate the A/D calibration coefficients and writes the A/D calibration coefficients into nonvolatile memory 287 in the transmitter chip 210. Such fitting algorithms are available in the art and with the ZMD31050 chip described above.

To determine the D/A calibration coefficients, the transmitter section 13 of assembly 10 is placed in a temperature chamber at a first transmitter temperature and a first digital temperature number is measured from an on-chip temperature sensor. The digital temperature numbers from the on-chip temperature sensor will be referred to herein as the "ASIC temperature numbers" to distinguish them from the previously-described digital input numbers. An initial typical D/A calibration coefficient number for the first output current is written into the D/A calibration register 285. With the sensor section 20 of the assembly at a first sensor temperature, the output current level is measured by a current measurement test system connected to the 4 mA-20 mA current output terminals 27a and 27b (shown in FIG. 1), and compared to the desired output current for the first sensor temperature. For example, if the sensor temperature is at mid-span, the D/A output current should be 12 mA, which is exactly halfway between the minimum 4 mA and maximum 20 mA output current levels. If the measured output current is above the desired output current for the first sensor temperature, the D/A calibration coefficient number for the first output current is reduced and written into the D/A register 285. The output current is then remeasured by the test system, compared to the desired level and the coefficient number adjusted until the desired output current level is achieved. The test software records the first digital ASIC temperature number and the first adjusted D/A calibration coefficient number in a table. The temperature chamber is then set to a second transmitter temperature and a second digital ASIC temperature number is measured from the on-chip temperature sensor. The D/A output current is again measured by the test system and compared to the desired output current for the first sensor temperature. The output current is adjusted as before until the desired output current level is achieved. The test software records the second digital ASIC temperature number and the second adjusted D/A calibration coefficient number in the table. This enables data processor 282 to maintain the midpoint value at the desired value despite changes in the temperature of chip 210.

Next, the sensor temperature is changed to the second sensor temperature (which is at an extreme point of the temperature range for temperature sensor 21) and the same D/A calibration procedure is repeated to generate third and fourth digital ASIC temperature and adjusted D/A calibration coefficient numbers for the table. In this case, the target output current from the D/A converter is either 4 mA or 20 mA, depending upon which temperature extreme point was chosen. This ensures that the output current of chip 210 will go to one current extreme point when temperature sensor 21 goes to the corresponding temperature extreme point, but does not necessarily ensure that the output current will go to the other current extreme point when temperature sensor 21 goes to the other temperature extreme point. To ensure this, the second-order correction procedure described next may be used.

If second-order sensor temperature correction is desired, the sensor temperature is then changed to the third sensor temperature (which is at the other extreme point of the temperature range for temperature sensor 21), and the D/A calibration procedure is repeated to generate fifth and sixth digital ASIC temperature and adjusted D/A calibration coefficient numbers for the table. Use of these coefficients for correction is explained in the product materials for the ZMD31050 chip.

Once all the needed numbers are generated for the table, the test software uses a fitting algorithm to calculate the D/A calibration coefficients and writes the D/A calibration coefficients into nonvolatile memory 287 in the transmitter chip 210.

On power up, the contents of nonvolatile memory 287 are recalled into A/D calibration register 284 and D/A calibration register 285 such that the digital processor 282 can continuously perform the digital correction during normal operation. These coefficients collectively provide the coefficients $A_{0,C}$, $A_{1,C}$, $A_{2,C}$, and $A_{3,C}$ used in the mapping function illustrated in equation [1] above.

When the calibration and setting is done, the transmitter and output circuit generate an output current that is in the range of 4 mA-20 mA and that is a linear and accurate representation of the temperature sensed by the sensor section of the assembly.

The output signal generated by temperature sensor 20 can be characterized as having a value that deviates from a first linear relationship between its value and the sensed temperature by a first percentage for a first span of temperature (e.g., the span measure at the factory). This first span of temperature has two end points, and the first linear relationship comprising a straight line drawn between the values that the temperature sensor's output has at the two end points of the first span. Similarly, the output signal generated by the programmable transmitter has a value that deviates from a second linear relationship between its value and the sensed temperature by a second percentage for the first span of temperature. The second linear relationship comprising a straight line drawn between the values that the transmitter chip's output has at the two end points of the first span. With the calibration done, the second percentage significantly is less than the first percentage.

FIG. 3 is a three-dimensional view of an exemplary assembly 10 mounted in a sensor tube 340 and a DIN Form B compatible transmitter housing 320 to provide a programmable temperature sensor unit. Housing 320 includes a top 321 and a base 322. The sensor-probe section of assembly 10 is first inserted into sensor tube 340 with the sensor end S (20) located near or at the closed end 341 of sensor tube 340. Using standard industry methods, the sensor end S is packed with a thermally conductive powder such as MgO followed by epoxy to seal the sensor end S and more epoxy at end 342 to completely seal the sensor tube 340. The sensor-probe section of assembly 10 exits the sensor tube 340 at 342 and is routed through a connection head (not shown) to the entrance aperture 327 in the base 322 of housing 320. With the top 321 removed, assembly 10 is threaded through the entrance aperture 327, an example of which is shown in more detail later in FIG. 4, and the programmable transmitter section (shown at reference number 12 in FIG. 3) is then located in the lower section of housing base 322. The programmable transmitter section 12 of assembly 10 is mounted in the housing base 322 on support structures (shown at 402 and 403 in FIG. 4) with the component side down. Information such as part number, temperature range, and serial number can be printed on the back surface of transmitter section 12 and viewed through a rectangular window 325 in housing top 321 after the assembly is complete (window 325 can comprise an aperture or a section of transparent plastic). The output section 15 of assembly 10 is then positioned in the upper section of base 322 with the programming jack 26 and terminal block 27 positioned such that they fit through apertures 331 and 324, respectively, in top 321. Once the transmitter section 12 and output section 15 are in place, any extra length of assembly 10 can be placed in the open housing base 322, with the housing top 321 thereafter being installed on top of housing base 322. Terminal block 27 extends through aperture 324 in top 321 and provides access to terminals 27a and 27b to connect to an external 4-20 mA current loop. As indicated above, terminals 27a and 27b may comprise spring-force connectors. Aperture 331 provides access to the programming jack 26 for a mating plug (not shown) to allow the user to connect to assembly 10 in the field when a hinged lid 332 is open as shown in FIG. 3. Hinged lid 332 is closed and is held closed by mating together edge 335 on the lid 332 and edge 334 on top 321. Hinged lid 332 is opened by pressing on the front surface 335 to release the mating edges 333 and 334. Housing top 321 and base 322 have a left hole 328 and a right hole 329 that accept a pair of mounting bolts for fastening the housing 320 to a connection head (not shown). An access area 326 is provided in the center of the housing top 321 to enable a sensor tube to extend vertically through the entrance aperture 327 above the housing top 321 as is required in some probe configurations.

Figure 4:
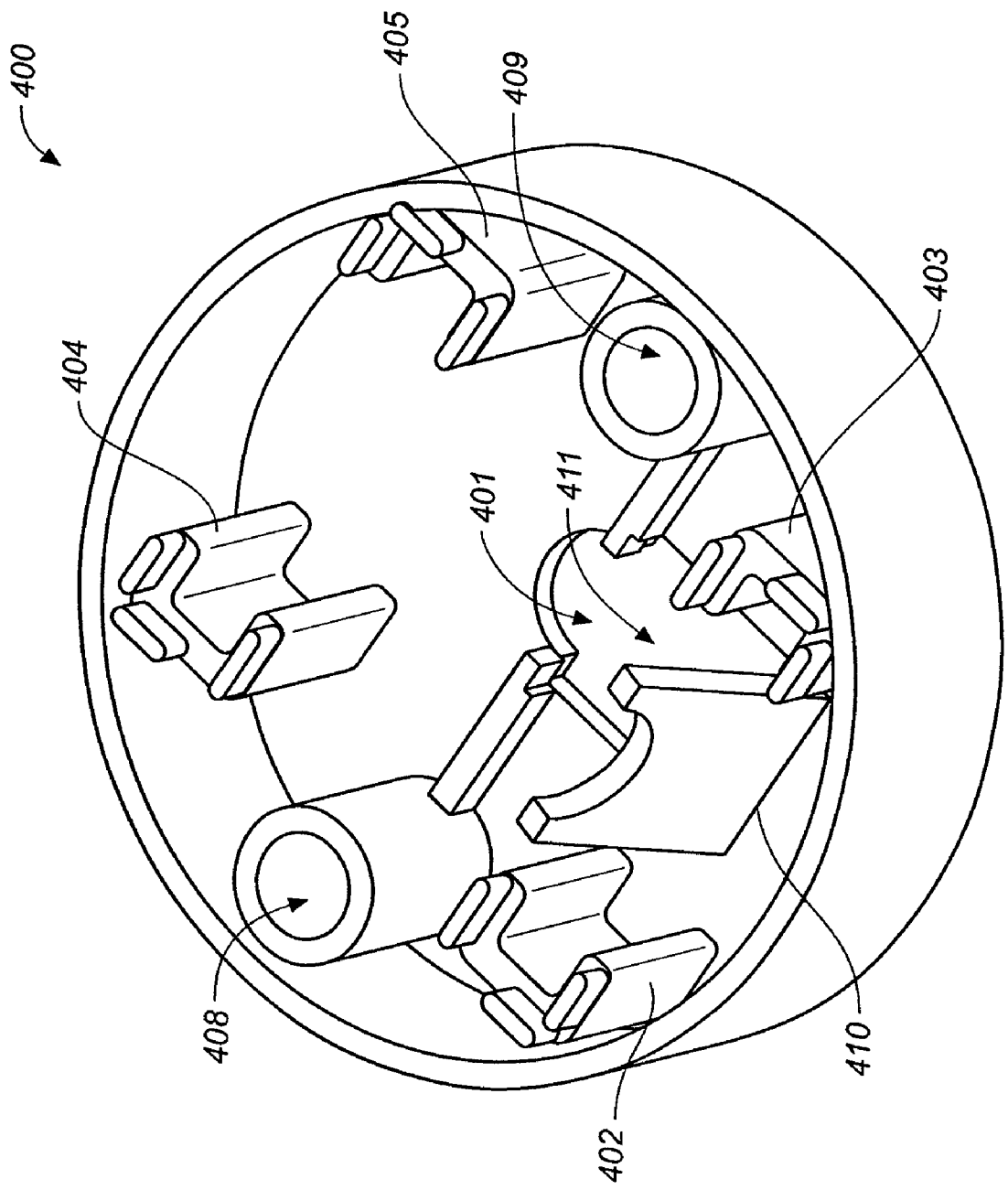
FIG. 4 is a three-dimensional view of the DIN Form B compatible programmable transmitter housing base for use in at least one of the present inventions.

FIG. 4 is a three-dimensional view of a DIN Form B compatible transmitter housing base 400 that is suitable for use as housing base 322 shown in FIG. 3. Base 400 includes an access door 410 and access area 411. When hinged access door 410 is open, the access area 411 is about 0.4" by 0.5" which provides adequate room to thread the output section 15 with attached terminal block 27 and programming jack 26 (not shown in FIG. 4), which are soldered onto the output section during flex subassembly manufacturing, through the bottom of base 400. After assembly 10 is threaded through the open access area 411, hinged access door 410 is closed and the assembly passes through access hole 401 with a diameter of 0.280", which complies with the DIN Form B standard. Base 400 also includes left and right support structures 402 and 403, respectively, with guides for the transmitter section 12 of the assembly. Base 400 further includes left and right support structures 404 and 405, respectively, with guides for the output section 15 of the assembly. Base 400 also includes left and right holes 408 and 409, respectively, for mounting bolts located 1.30" (33 mm) apart on center as per the DIN Form B specification. The outside diameter of base 400 is 1.73" (44 mm) as per the DIN Form B specification.

Figure 5:
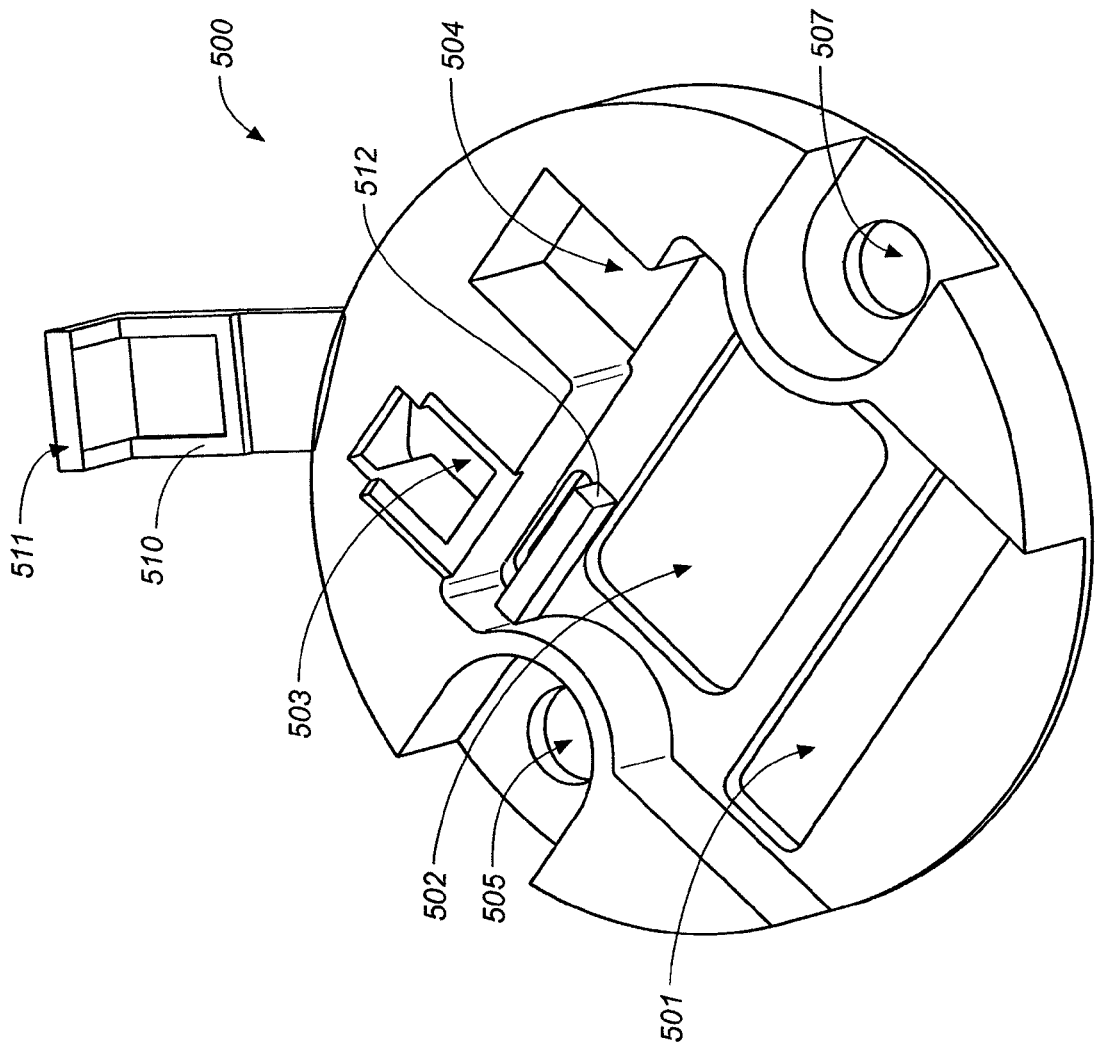
FIG. 5 is a three-dimensional view of the DIN Form B compatible programmable transmitter housing top for use in at least one of the present inventions.

FIG. 5 is a three-dimensional view of a DIN Form B compatible transmitter housing top 500 that is suitable for use as the housing top 321 shown in FIG. 3. Top 500 includes a rectangular hole 501 to allow information printed on the back surface of the programmable transmitter section to be viewed, and an access area 502 for a sensor tube to extend up through if needed. Top 500 includes a rectangular hole 503 to allow an external mating plug (not shown) to connect to the programming jack. A hinged lid 510 to cover the programming jack is attached to top 500 and includes mating edge 511 which mates with edge 512 on top 500 to hold hinged lid 510 closed. Top 510 also includes hole 504 to allow access to the terminal block to connect to external 4-20 mA current loop wires (not shown). Top 500 also has left and right holes 505 and 507, respectively, for mounting bolts to fasten top 500 to the housing base and a connection head. The dimensions of the housing top 500 match the housing base and conform to the DIN Form B specification.

FIG. 6 shows a three-dimensional view of a complete temperature sensor unit 600 with 4 mA-20 mA outputs using a miniature transmitter housing 620. The sensor end S of an exemplary assembly 10 is installed in the closed end of sensor tube 640 and the programmable transmitter section 12 and output section 15 are mounted in a miniature transmitter housing 620. The miniature transmitter housing is commonly used in the HVAC market to fit inside wall-mounted or duct-mounted temperature sensor assemblies (not shown). To be compatible with other miniature transmitters available in the HVAC market, the length of housing 620 is 1.5", the width is 1.0" and the height is 0.67", with a 0.149"-diameter mounting hole 621 located 0.5" from the right side and 0.25" from the lower edge. Housing 620 includes a rectangular opening 622 to view product information printed on the back surface of the transmitter section 12. Housing 620 has an opening 623 to fit a terminal block 27, which is soldered onto the output section 15 during flex subassembly manufacturing. Terminal block 27 includes two terminals 27a and 27b for connecting external 4-20 mA current loop wires. As indicated above, terminals 27a and 27b may comprise spring-force connectors. Housing 620 has a rectangular hole 626 to allow an external mating plug (not shown) to connect to the programming jack 26. A hinged lid 627 to cover programming jack 26 is attached to the top of housing 620 by a hinge 628, and includes mating edge 629 which mates with edge 630 on the top of housing 620 to hold hinged lid 627 closed.

Figure 7:
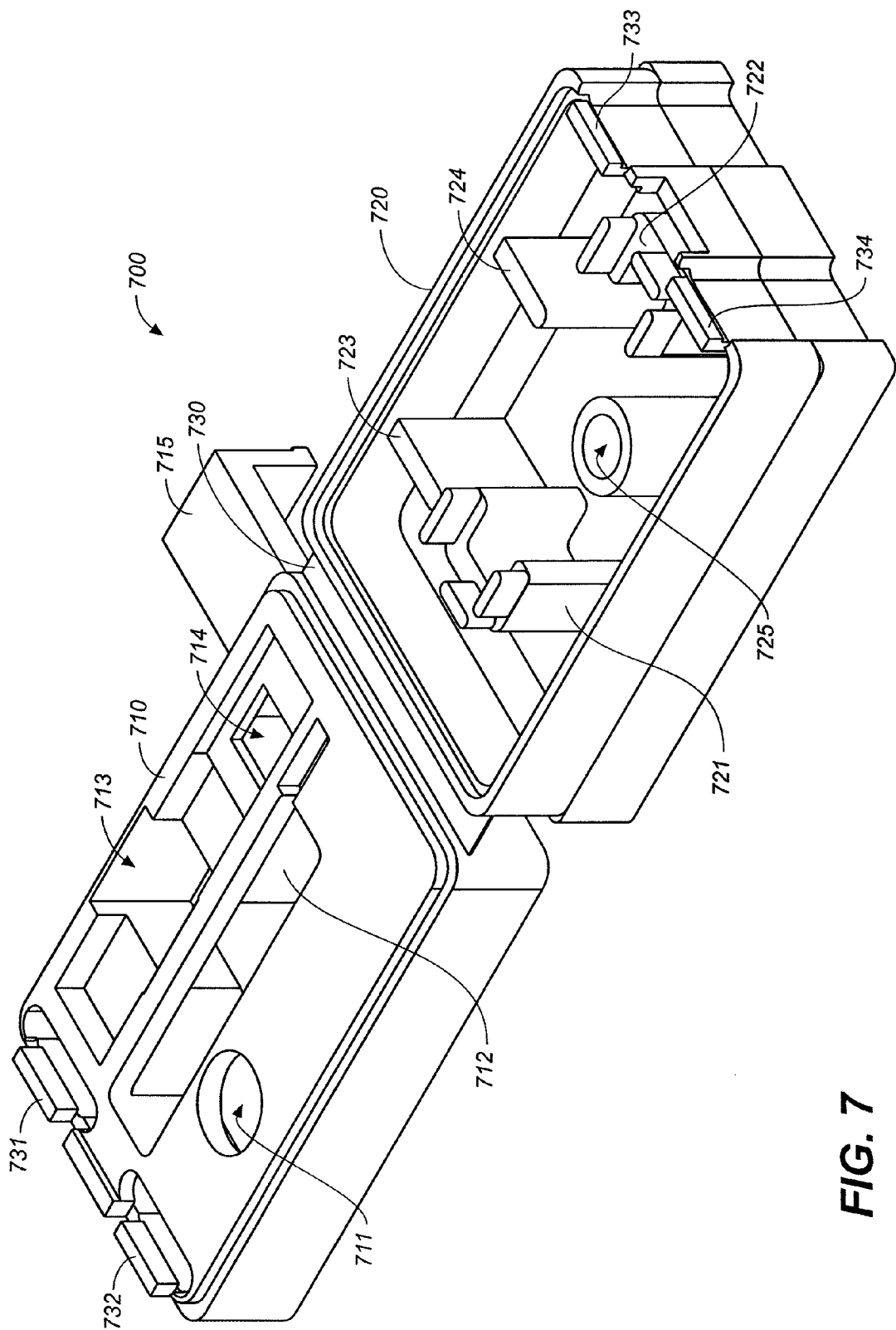
FIG. 7 is a three-dimensional view showing the inside of the miniature programmable transmitter housing according to at least one of the present inventions.

FIG. 7 shows a three-dimensional view of the inside of the miniature transmitter housing 700 that is suitable for use as the miniature transmitter housing 620 shown in FIG. 6. Housing 700 includes a base 720 and a top 710, which flips open to the left with a thin molded plastic hinge 730 connecting the top 710 to base 720. When the top 710 is closed, edges 731 and 732 on top 710 mate with edges 733 and 734 to hold the hinged top 710 closed to base 720. Left and right support structures 721 and 722, respectively, with a plurality of guides thereon, are provided to hold the transmitter section. Left and right structures 723 and 724 are provided to hold the output section at the proper elevation. A mounting bolt hole 725 is provided to mount the miniature case either by a threaded screw from the bottom or by a bolt through the miniature case. The miniature housing top 710 has a mounting bolt hole 711, a transmitter section viewing hole 712, a hole and support structure 713 for a terminal block and an access hole 714 for a programming jack. A hinged lid 715 is attached to miniature housing top 710 to cover the programming jack. The miniature transmitter probe is assembled by first installing the sensor end S in a sensor tube 640 as described earlier. The miniature transmitter housing 700 is mounted to a box or wall plate (not shown) and the top 710 is flipped open. The flex from the sensor tube 640 is positioned on the right side of the base 720, and the transmitter section 12 of the assembly 10 is placed on support structures 721 and 722 and the output section 15 with a terminal block and programming jack is put into the terminal block support structure 713 and access hole 714. The top is then closed to complete assembly of the probe.

Figure 8:
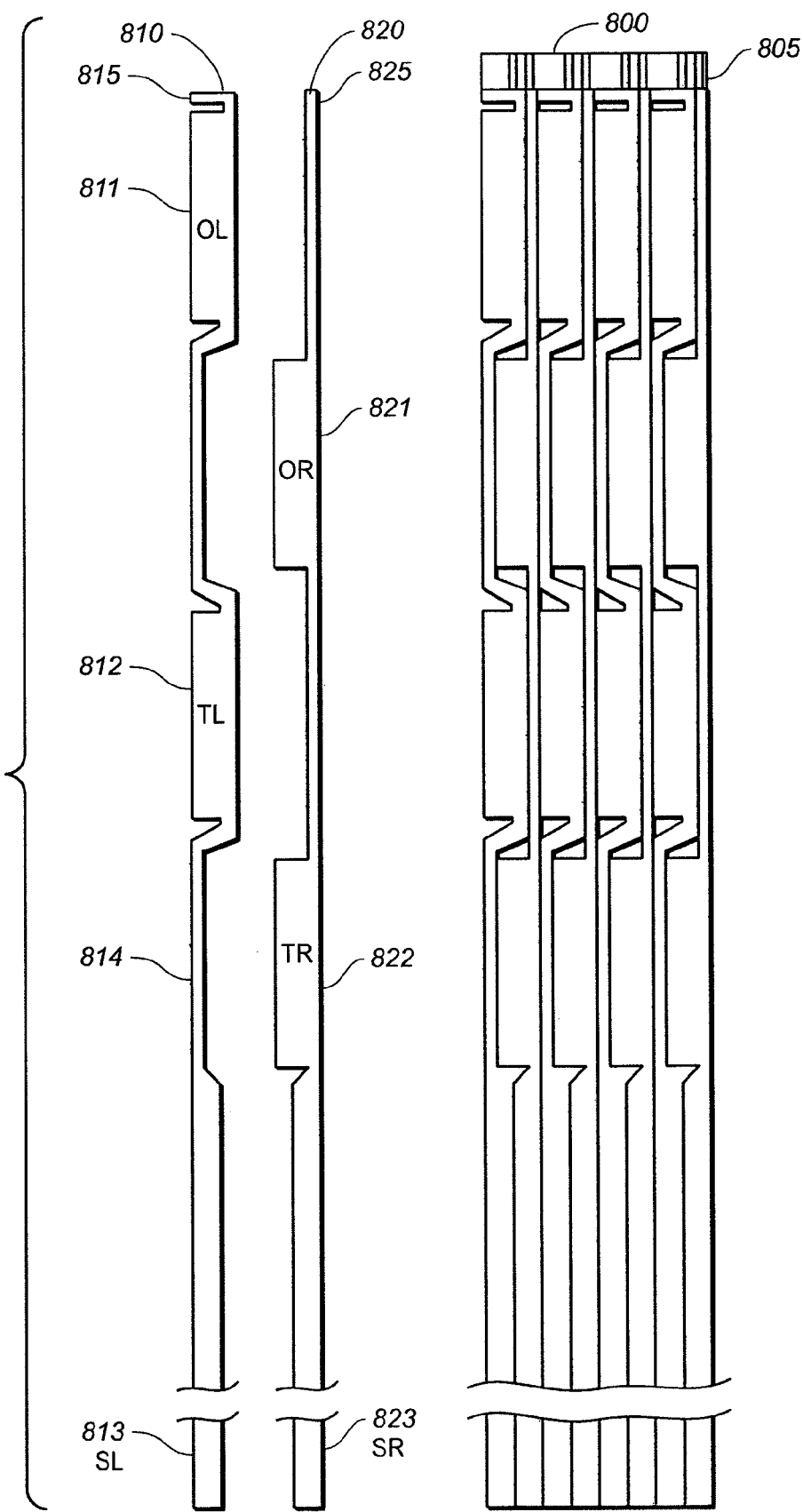
FIG. 8 is a plan view of an array of flexible circuit substrates according to at least one of the present inventions.

FIG. 8 shows a plan view of a left flex assembly 810 and a right flex assembly 820, each of which is suitable for use in any of the previously described assemblies (e.g., assembly 10). Assembly 810 includes a left output section 811, a left transmitter section 812, and a left sensor section 813. Assembly 820 includes a right output section 821, a right transmitter section 822, and a right sensor section 823. The left and right assemblies are designed to fit together in an array such that multiple flex assemblies can be placed closely together on one flex panel. The width of each sensor section is 0.15", so the combined width of the left and right subassemblies is 0.30". The transmitter and output sections have to be wider than 0.15" to accommodate the transmitter chip 210, power transistor 16, and output traces 17 and 18. The transmitter section 812 is offset vertically from transmitter section 822 so transmitter section 822 can be made 0.23" wide and a narrow section 814 interconnecting the left sensor section 813 to the left transmitter section 812 is made 0.07" to maintain the combined width of 0.30". The same layout technique is used on output sections 821 and 811 to allow the left transmitter section 812 to be 0.23" wide, right output section 821 to be 0.23" wide and left output section 811 to be 0.23" wide respectively. The top end of subassemblies 810 and 820 include a set of traces 815 and 825, respectively, to allow a connector to connect the serial interface signals SC 24 and SD 25 and "+" and "−" outputs 17 and 18, respectively, to a tester for testing.

An array 800 shows an example of 4 pairs of subassemblies 810 and 820 laid out next to each other with no space between them in order to fit as many flex subassemblies 810 and 820 on a flex panel as possible. (In typical embodiments, approximately 30 such subassemblies are grouped together on a single flex panel (flex sheet). Sets of traces 805 are used to connect all the subassemblies in array 800 to a tester so all of the subassemblies can be tested at the same time.

Second Exemplary Calibration and Setting Procedure. We disclose herein a second calibration and setting procedure which can be used with the above-identified ZMD chip, and which is currently more preferred than the first procedure. As indicated above, the ZMD chip receives the temperature sensor's output signal as a differential input signal at its terminals V1 and V2, and generates from it an output signal at its "B" pin (pin 221 in FIG. 2), which in turn sets the current in the current loop by way of NPN transistor 16. To generate its output, the ZMD chip can be configured to continuously iterate the following four-step process. As the first step, the chip digitizes the differential input signal using an A/D converter to generate a digital representation of the input signal, which we will call "Input" in the following discussion. The chip also digitizes the analog value of the transmitter's temperature from its own on-chip temperature sensor to generate a digital representation of the transmitter's temperature, which we will call "Tt." As the second step, the digitized value Input is divided by a gain factor $C_1$, and an offset value $C_0$ is added to generate an intermediate value, which we will call Y." The gain factor and offset are preferably selected such that T spans a range of values substantially between 0 and 1 over the intended working temperature range of the temperature sensor 20. The intermediate value Y is further corrected for variations in the gain factor and offset caused by a variation in the transmitter's temperature. Such correction is useful because the chip's reference voltage VREF changes with temperature, which changes the voltage applied to sensor 20 and the voltage used by the A/D and the D/A, and because the component values of the non-precision resistors $R_1$-$R_4$ and $R_S$ will vary with temperature (their temperature is assumed to be the same as that of the transmitter chip since they are assembled in close proximity to one another on the flexible-circuit substrate). The results of the second step can be summarized by the equation (2) below, where the corrections to account for the transmitter temperature are shown within brackets:

$$Y = \frac{\text{Input} + C_0 + [C_4 * Tt + C_5 * Tt^2]}{C_1 + [C_6 * Tt + C_7 * Tt^2]}, \quad (2)$$

where the range of Y substantially spans between 0 and 1. $C_4$ is a first-order correction coefficient for the offset ($C_0$), and $C_5$ is a second-order correction coefficient for the offset. $C_6$ is a first-order correction coefficient for the gain factor ($C_1$), and $C_7$ is a second-order correction coefficient for the gain factor.

At this point, the intermediate value has been corrected for variations caused by the programmable transmitter circuitry, but has not been corrected for the nonlinearity between the temperature sensed by sensor 20, and the output signal of sensor 20 (which has been digitized as signal "Input"). As the third step in the process, this nonlinearity is corrected by applying second order and third-order corrections to the intermediate value Y, as provided by equation (3):

$$\text{Output} = Y^*(1 - C_2 - C_3) + C_2 * Y^2 + C_3 * Y^3, \quad (3)$$

where $C_2$ is a second-order correction coefficient (similar to the above $A_2$ coefficient), and $C_3$ is a third-order correction coefficient (similar to the above $A_3$ coefficient). This generates a digital signal, called "Output," which will be used to generate the analog output at its "B" pin (Pin 221 in FIG. 2). The above form of equation (3) keeps the span of "Output" within the range of 0 to 1, as long as the range of Y is between 0 and 1. As the fourth step, the digital value "Output" is provided to a D/A converter to generate an analog signal (preferably as a current), that is provided at its "B" pin. The ZMD chip reiterates these four basic steps several times a second to generate the corrected temperature signal at its "B" pin (Pin 221 in FIG. 2), which in turn sets the current in the current loop by way of NPN transistor 16.

A software program provided by ZMD is used to correction coefficients $C_0$-$C_7$ from a set of three parameters and 16 measured characteristics of the temperature sensor unit. The parameters and measured characteristics are listed and explained in Table 1.

TABLE I

Parameters:

T4mA, T20mA - Parameters that indicate the desired Minimum and Maximum temperatures, respectively, that the sensor system is programmed to, such that the output current is 4 mA when the sensor temperature is at T4mA, and the output current is 20 mA when the sensor temperature is at T20mA.
Units - Parameter that indicates whether T4mA and T20mA are in units of Celsius or Fahrenheit (e.g., Units = C for Celsius, =F for Fahrenheit).
Measured Characteristics:

Shm, Slm, Smm - The digitized values (A/D values) of the temperature sensor signal provided to the chip's input (terminals V1 and V2), with the sensor in a test chamber at high (TCh), low (TCl), and middle (TCm) temperatures, respectively, and with the transmitter chip at a middle temperature (TTm).
TCh, TCl, TCm - The measured temperature values of the test chamber in which the digitized sensor values Shm, Slm, and Smm are measured.
Rh, Rl, Rm - The digital values provided to the input of the D/A converter to achieve the high, low, and middle output loop currents (such as at or TABLE I-continued near 20 mA, 4 mA, and 12 mA), respectively, with the sensor in the test chamber at high (TCh), low(TCl), and middle (TCm) temperatures, respectively, and with the transmitter chip at a middle temperature (TTm).
Shl, Shh - The digitized values (A/D values) of the temperature sensor signal provided to the chip's input (terminals V1 and V2), with the sensor in a test chamber at the high (TCh) sensor temperature, and with the transmitter chip at a low temperature (TTl) to measure Shl, and a high temperature (TTh) to measure Shh, respectively.
Sll, Slh - The digitized values (A/D values) of the temperature sensor signal provided to the chip's input (terminals V1 and V2), with the sensor in a test chamber at the low (TCl) sensor temperature, and with the transmitter chip at a low temperature (TTl) to measure Sll, and a high temperature (TTh) to measure Slh, respectively.
TTh, TTl, TTm - The measured value of the high, middle, and low temperatures of the transmitter at which the digitized sensor values Shh, Slh, Shl, Sll, Shm, Slm, and Smm are measured. Each of TTh, TTl, and TTm is preferably the digitized value (A/D value) of the chip's internal temperature sensor at the corresponding temperature.

At the factory, the parameters T4 mA and T20 mA are set to the widest range of temperatures that temperature sensor 20 is intended to sense, and the Units parameter is set to either Celsius or Fahrenheit (Celsius is generally preferred). Parameters T4 mA and T20 mA TCh, TCl, TCm, TTh, TTl, and TTm are in Celsius. Also, an operating range for the transmitter is selected (typically −25° C. to +75° C.). The following general procedure may then be used to obtain the measured characteristics. The transmitter is powered up through connectors 27a and 27b, and placed in a transmitter temperature chamber at a temperature near the desired middle temperature value (e.g., +25° C. for a range of −25° C. to 75° C.). The transmitter chamber may be conventional oven or a thermoelectric device set up. In addition, the transmitter is set to use an initial set of correction coefficients $C_0$-$C_7$, which will enable the D/A converter of the transmitter to provide output signals in relation to the sensed temperature, to enable the Rh, Rm, and Rl values to be determined. (The default correction coefficients may be computed with the ZMD coefficient generation software program using default values, which can be based on measurements of prior devices.) Next, the value TTm is measured using the chip's A/D converter. Next, with the temperature sensor (e.g., sensor 20) placed in a sensor test chamber, the sensor is exposed to a temperature equal to or slightly above T20 mA, and the characteristics TCh, and Shm are measured. The sensor chamber may be conventional liquid bath that is controlled to a precise, even temperature with a pump to circulate the bath liquid, or the sensor chamber may comprise an accurate dry-well set up. Then, the current of the current loop is measured and compared to the desired loop current that the sensor is to output for the measured sensor temperature TCh. The Rh value is adjusted to bring the measured current value to the desired loop current value, a new set of correction coefficients $C_0$-$C_7$ is computed and loaded into the transmitter. (The correction coefficients may be computed with the ZMD coefficient generation software program using the latest value of Rh, the other acquired measured characteristics, and default values for the measured characteristics that have not yet been obtained.) These steps are preferably reiterated until two successive values of Rh are within a predetermined tolerance, with the final value being stored as the measured characteristic Rh. The temperature of the transmitter chamber is then lowered to the intended low temperature TTl for the transmitter, and the characteristics TTl and Shl are measured. Next, the temperature of the transmitter chamber is raised to the intended high temperature TTh for the transmitter, and the characteristics TTh and Shh are measured.

Next, the temperature of the transmitter chamber is brought back to TTm, and the temperature of the temperature sensor chamber is brought to a value that is equal to or slightly less than T4 mA, and the characteristics TCl and Slm are measured. The characteristic TTm may be measured again and averaged with its previously measured value, but this is not necessary if it is close to its previous value (which may be accomplished by temperature control circuitry on the transmitter chamber). A new set of correction coefficients $C_0$-$C_7$ is then computed with the ZMD coefficient generation software program using the previously acquired measured characteristics to update the corresponding default values, and loaded into the transmitter. Then, the current of the current loop is measured and compared to the desired loop current that the sensor is to output for the measured sensor temperature TCl, the loop current being at or near 4 mA. The Rl value is adjusted to bring the measured current value to the desired loop current value, a new set of correction coefficients $C_0$-$C_7$ is then computed using this latest value for Rl, loaded into the transmitter, and the value of Rl is determined again as indicated above. (The correction coefficients may be computed with the ZMD coefficient generation software program using the latest value of Rl, the other acquired measured characteristics, and default values for the measured characteristics that have not yet been obtained.) These steps are preferably reiterated until two successive values of Rl are within a predetermined tolerance, with the final value being stored as the measured characteristic Rl. Next, the temperature of the transmitter chamber is lowered to the low temperature TTl for the transmitter, and the characteristic Sll is measured. The characteristic TTl may be measured again and averaged with its previously measured value, but this is not necessary if it is close to its previous value. Next, the temperature of the transmitter chamber is raised to the high temperature TTh for the transmitter, and the characteristic Slh is measured. The characteristic TTh may be measured again and averaged with its previously measured value, but this is not necessary if it is close to its previous value.

Next, the temperature of the transmitter chamber is brought back to TTm, and the temperature of the sensor chamber is brought to a value that is near the midpoint between T4 mA and T20 mA (e.g., 0.5*(T4 mA+T20 mA)), and the characteristics TCm and 5 mm are measured. The characteristic TTm may be measured again and averaged with its previously measured values, but this is not necessary if it is close to its previous value. A new set of correction coefficients $C_0$-$C_7$ is then computed with the ZMD coefficient generation software program using the previously acquired measured characteristics to update the corresponding default values, and loaded into the transmitter. Then, the current of the current loop is measured and compared to the desired loop current that the sensor is to output for the measured temperature TCm, the loop current being at or near 12 mA. The Rm value is adjusted to bring the measured current value to the desired loop current value, a new set of correction coefficients $C_0$-$C_7$ is then computed using this latest value for Rm, loaded into the transmitter, and the value of Rm is determined again as indicated above. (The correction coefficients may be computed with the ZMD coefficient generation software program using the latest value of Rm and the other acquired measured characteristics, and no default values.) These steps are preferably reiterated until two successive values of Rm are within a predetermined tolerance, with the final value being stored as the measured characteristic Rm.

These parameters and measured characteristics are then provided to the ZMD coefficient generation software program, which computes the coefficients $C_0$-$C_7$, and stores them to execute the above steps related to equations (2) and (3). Also, the parameters and measured characteristics are stored into serial EEPROM 240 to enable the temperature assembly to be reprogrammed by the user in the field for a different temperature range (e.g., T4 mA to T20 mA) than that programmed at the factory.

Exemplary Reprogramming Procedure. To reprogram the sensor system to a desired temperature range in the field, the user disconnects the sensor system from the 4-20 mA current loop and plugs a serial interface adapter plug into the programming jack 26 on the sensor assembly 10. This can be done with assembly 10 disposed in a housing. Then the user starts a programming software program which directs a data processor to perform the following steps:

1. Accessing the serial interface to read the 3 parameters and 16 measured characteristics previously stored in the serial EEPROM 240 at test.
2. Prompting the user to enter the desired temperature units ° C. or ° F.
3. Prompting the user to enter a new minimum and maximum sensor temperature, T4 mA' and T20 mA', respectively, and desired Units value.
4. If Fahrenheit units are chosen, the new desired T4 mA' and T20 mA' are converted to Celsius before using the 16 measured characteristics (which are in Celsius).
5. Verifying the new sensor temperature range is within the temperature range over which the sensor system was tested.
6. Accessing the serial interface to save the desired units and new temperature range parameters in the serial EEPROM.
7. Generating a set of replacement characteristics from the measured characteristics. Preferably accurate second-order and third-order order interpolation methods are used to assure minimal loss of accuracy due to these computations.
8. Calculating eight new coefficients $C_0$-$C_7$ using the ZMD software program with T4 mA', T20 mA', and the replacement characteristics as inputs.
9. Accessing the serial interface to write the new coefficients $C_0$-$C_7$ into the transmitter's nonvolatile memory.

When the sensor system is disconnected from the serial interface adapter and connected to a 4 mA to 20 mA current loop, the transmitter will power up and automatically output a loop current that accurately represents the new sensor temperature range. Each of the above steps may be implemented by a corresponding instruction set A1-A9 that is embodied on a computer-readable medium (shown in FIG. 9) and that is adapted to direct a data processor to perform the task indicated by the corresponding step. The data processor may be provided by a desktop computer, handheld computer, PDA, cell phone, etc., and equivalents thereof. The computer-readable medium can comprise any computer readable medium, including but not limited to: volatile chip memory, nonvolatile chip memory, disk storage, CD-ROM, DVD, carrier wave (e.g., Internet downloading), and equivalents thereof.

An exemplary set of replacement characteristics generated in step 7 may be as follows. The measured transmitter temperatures TTl, TTm, and TTh remain unchanged since the range for the transmitter temperature need not be changed to change the sensor's temperature range. The output values Rh, Rm, and Rl for the D/A converter are also unchanged since these parameters govern the range of the output loop current, which does not change from the range of 4 mA to 20 mA. However, new sensor temperature values TCh', TCl', and TCm' replace the old measured temperature values TCh, TCl, and TCm, respectively, where TCh'=T20 mA' and TCl'=T4 mA'. It is not preferred to select the middle temperature value TCm' as the exact midpoint between T4 mA' and T20 mA'. Rather, it is preferred to select the middle temperature value TCm' to be the in same relative position to T4 mA' and T20 mA' as Tm is to TCl and TCh, which can be expressed as: (TCm'−T4 mA')/(T20 mA'−T4 mA')=(TCm−TCl)/(TCh−TCl), which gives TCm'=(T20 mA'−T4 mA')*(TCm−TCl)/(TCh−TCl)+T4 mA'. Finally, new digitized sensor values Shm', Slm', and Smm' replace Shm, Slm, and Smm, respectively, and are generated using interpolation. Also, values Shl', Shh', Sll', and Slh' replace Shl, Shh, Sll, and Slh, respectively, and are also generated using interpolation.

To facilitate the interpolation, normalized values of the original sensor temperatures TCl, TCm, and TCl, the new sensor temperatures TCl', TCm', and TCl', and the digitized sensor values Shm, Slm, and Smm may be generated as follows:

$$TCl_N=(TCl-TCl)/(TCh-TCl)=0$$

$$TCm_N=(TCm-TCl)/(TCh-TCl)=\{\text{value between 0 and 1}\}$$

$$TCh_N=(TCh-TCl)/(TCh-TCl)=1$$

$$TCl'_N=(TCl'-TCl)/(TCh-TCl)=\{\text{value between 0 and 1}\}$$

$$TCm'_N=(TCm'-TCl)/(TCh-TCl)=\{\text{value between 0 and 1}\}$$

$$TCh'_N=(TCh'-TCl)/(TCh-TCl)=\{\text{value between 0 and 1}\}$$

$$Slm_N=(Slm-Slm)/(Shm-Slm)=0$$

$$Smm_N=(Smm-Slm)/(Shm-Slm)=\{\text{value between 0 and 1}\}$$

$$Shm_N=(Shm-Slm)/(Shm-Slm)=1$$

The normalization process essentially comprises a shift operation followed by a scaling operation, and it facilitates the interpolation of new sensor values (S) from the temperature values (T). One exemplary interpolation form between S and T is $S=T*(1-K)+K*T^2$, which has second-order accuracy. Using the values of $TCm_N$ and $Smm_N$ in this form, K may be found as follows: $K=(Smm_N-TCm_N)/(TCm_N-TCm_N^2)$. Using K and the above interpolation form, normalized values for the new digitized sensor values Slm', Smm', and Shm' may be obtained as follows:

$$Slm'_N=(1-K)*TCl'_N+K*(TCl'_N)^2$$

$$Smm'_N=(1-K)*TCm'_N+K*(TCm'_N)^2$$

$$Shm'_N=(1-K)*TCh'_N+K*(TCh'_N)^2$$

The new normalized values can be de-normalized as follows (un-scale followed by un-shift):

$$Slm'=(Slm'_N)*(Shm-Slm)+Slm$$

$$Smm'=(Smm'_N)*(Shm-Slm)+Slm$$

$$Shm'=(Shm'_N)*(Shm-Slm)+Slm$$

The new digitized temperature sensor values Sll' and Slh' are intended to corresponding to the digitized temperature sensor signal provided to the chip's input (terminals V1 and V2), with the sensor in a test chamber at the new low sensor temperature TCl', and with the transmitter chip at a low temperature (TTl) to measure Sll', and a high temperature (TTh) to measure Slh', respectively. To a good approximation, it can be assumed that the new sensor value Sll' is in the same relative position to the original-measured sensor values Sll and Slh as the new sensor value Slm' is to the originally-measure temperature values Slm and Shm: (Sll'−Sll)/(Slh−Sll)=(Slm'−Slm)/(Shm−Slm)=Slm'$_N$. Similarly, it can be assumed that the new sensor value Slh' is in the same relative position to the original-measured sensor values Sll and Slh as the new sensor value Slm' is to the originally-measure temperature values Slm and Shm: (Slh'−Sll)/(Slh−Sll)=(Slm'−Slm)/(Shm−Slm)=Slm'$_N$. These equations can be solved to produce:

$$Sll'=(Slm'_N)*(Shl-Sll)+Sll$$

$$Slh'=(Slm'_N)*(Shh-Slh)+Slh$$

The new digitized temperature sensor values Shl' and Shh' are intended to corresponding to the digitized temperature sensor signal provided to the chip's input (terminals V1 and V2), with the sensor in a test chamber at the new high sensor temperature TCh', and with the transmitter chip at a low temperature (TTl) to measure Shl', and a high temperature (TTh) to measure Shh', respectively. To a good approximation, it can be assumed that each of new sensor values Shl' and Shh' is in the same relative position to the original-measured sensor values Shl and Shh as the new sensor value Shm' is to the originally-measure temperature values Slm and Shm. From this, it follows that Shl' and Shh' can be solved as:

$$Shl'=(Shm'_N)*(Shl-Sll)+Sll$$

$$Shh'=(Shm'_N)*(Shh-Slh)+Slh$$

Instruction #7 described above (and shown in FIG. 9) may include instructions adapted to direct a data processor to generate the replacement characteristics using the above steps. If the user is not happy with the new temperature range that he or she initially selected, the above steps may be repeated using a new temperature range. Because the original measured characteristics are stored in EEPROM 240, they are not lost and always kept with the temperature sensor and transmitter with which they were measured.

It may be appreciated that EEPROM 240 (which is a nonvolatile memory) may be integrated together with the nonvolatile memory of transmitter chip 210. Currently the ZMD chip preferably does not have sufficient room for the data stored in EEPROM 240, but it is anticipated that ZMD will likely provide a successor product to the ZME31050 that will have sufficient nonvolatile memory space to the contents of EEPROM 240.

Figure 9:
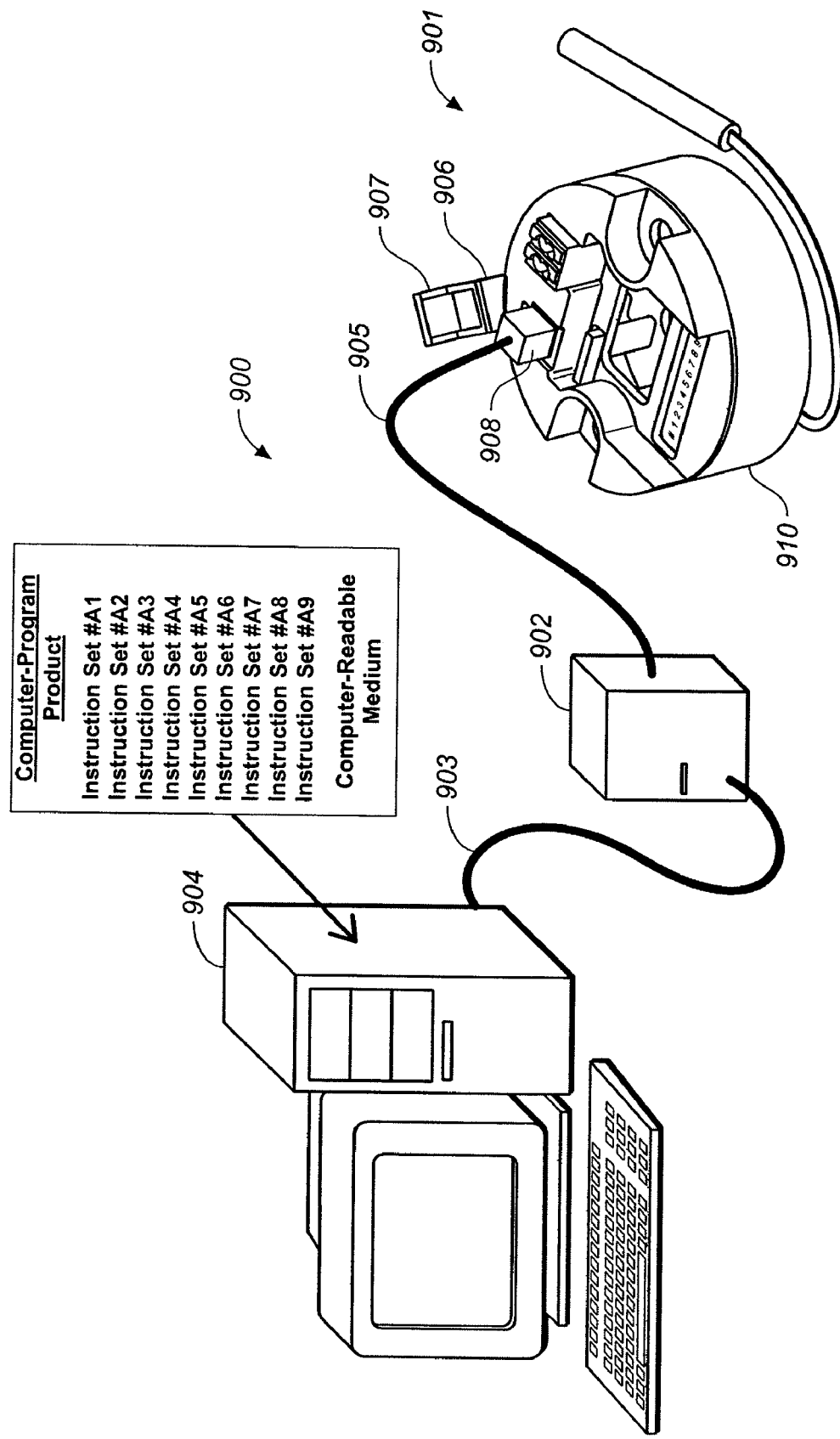
FIG. 9 is a perspective view of a programming system that enables a programmable temperature sensor unit to be reprogrammed in the field according to at least one of the present inventions.

FIG. 9 shows a complete programming system 900 that allows a user to reprogram the sensor system 901 in the field. A serial interface adapter 902 is connected through an appropriate cable 903 to a USB or serial port on a computer 904. Serial interface adapter 902 provides four signals, GND, VCC, SD, and SC to a 4-conductor cable 905 which is connected to a 4-connector plug 908 (4-position plug). Lid 907 in the DIN Form B case 910 is opened and plug 908 is plugged into programming jack (not shown). Lid 907 preferably remains connected to case 910 by way of hinge 906. A software program uses the serial interface to read the calibration constants previously stored in the EEPROM of the sensor system during prior tests (generally done at the factory). The software program prompts the user to enter the desired Tmin and Tmax, select the desired units (C or F), and then calculates new coefficients C0-C7 for the transmitter. The software program then uses the serial bus to write the new coefficients into the programmable transmitter's nonvolatile memory to complete reprogramming the sensor system to the new desired temperature range. In preferred embodiments, the software program comprises the nine steps described above, and preferably includes the nine instruction sets A1-A9 embodied on a computer-readable memory associated with the computer. While computer 904 is shown as a desk top computer, it may comprise a laptop computer, or a personal data assistant (PDA) or a cell phone running Window CE (or equivalent operating system), or a specially-designed handheld processor using a simple processor and I/O chip set. Serial interface adaptor 902 comprises relatively simple circuitry that is readily available, and can be integrated into the specially-designed handheld processor. It may comprise a USB to I2C-bus adaptor having a USB port for coupling to the computer processor, and an I2C port to provide the signals GND, VCC, SD, and SC for 4-conductor cable 905.

While the present inventions have been particularly described with respect to the illustrated embodiments, it will be appreciated that various alterations, modifications and adaptations may be made based on the present disclosure, and are intended to be within the scope of the present inventions. While the inventions have been described in connection with what are presently considered to be the most practical and preferred embodiments, it is to be understood that the present inventions are not limited to the disclosed embodiments but, on the contrary, are intended to cover various modifications and equivalent arrangements included within the scope of the appended claims.

What is claimed is:

1. A temperature-sensing and transmitting assembly comprising:

a flexible circuit substrate comprising a polymer sheet having a first area and a second area, a first plurality of interconnect pads disposed in the first area for electrically coupling to at least a temperature sensor, a second plurality of interconnect pads in the second area for electrically coupling to a programmable transmitter, and a first electrical trace extending from at least one of the first plurality of interconnect pads to at least one of the second plurality of interconnect pads;

a temperature sensor mounted to at least one of the first plurality of interconnect pads and electrically coupled to at least the first electrical trace, the temperature sensor being adapted to sense a temperature and generate an output signal representative of the sensed temperature; and a programmable transmitter mounted to at least a plurality of the second plurality of interconnect pads and electrically coupled to at least the first electrical trace, the programmable transmitter having an input to receive a signal representative of the sensed temperature, and an output to provide an output signal representative of the sensed temperature.

2. The temperature-sensing and transmitting assembly of claim 1 wherein the output signal generated by the temperature sensor has a value that deviates from a first linear relationship between its value and the sensed temperature by a first percentage for a first span of temperature, the first span of temperature having two end points, the first linear relationship comprising a straight line drawn between the values of the temperature sensor's output at the two end points of the first span;

wherein the output signal generated by the programmable transmitter has a value that deviates from a second linear relationship between its value and the sensed temperature by a second percentage for the first span of temperature, the second linear relationship comprising a straight line drawn between the values of the programmable transmitters output at the two end points of the first span; and wherein the second percentage is less than the first percentage.

3. The temperature-sensing and transmitting assembly of claim 1 wherein the temperature sensor comprises a semiconductor-junction diode.

4. The temperature-sensing and transmitting assembly of claim 1 wherein the temperature sensor comprises a plurality of semiconductor junction diodes.

5. The temperature-sensing and transmitting assembly of claim 4 wherein at least two of the plurality of semiconductor junction diodes are electrically coupled in series.

6. The temperature-sensing and transmitting assembly of claim 1 wherein the output signal of the programmable transmitter is a current signal whose values are within the range of approximately 4 mA to approximately 20 mA.

7. The temperature-sensing and transmitting assembly of claim 1 wherein the programmable transmitter comprises a mapping circuitry that generates the programmable transmitter's output signal from the output signal of the temperature sensor, wherein the mapping circuitry has at least one aspect that can be programmed after the programmable transmitter is mounted to the flexible circuit substrate.

8. The temperature-sensing and transmitting assembly of claim 1 wherein the flexible circuit substrate further comprises a portion that spans between the first and second areas of the flexible circuit substrate, the portion having a length from the first area to the second area and a width transverse to its length, the width being less than the length.

9. The temperature-sensing and transmitting assembly of claim 1 further comprising bias circuitry that biases the temperature sensor with a current that is less than 100 µA.

10. The temperature-sensing and transmitting assembly of claim 1 wherein the output signal of the programmable transmitter is a current signal, and wherein the assembly further comprises a current sensing resistor coupled to the programmable transmitter's output to sense the loop current, the current sensing resistor being a non-precision component.

11. The temperature-sensing and transmitting assembly of claim 1 further comprising:
two connection terminals for connecting the assembly to an external current-sense loop, and a bridge rectifier disposed between the output of the programmable transmitter and the connection terminals.

12. The temperature-sensing and transmitting assembly of claim 11 where the connection terminals comprise springforce connectors.

13. The temperature-sensing and transmitting assembly of claim 1 further comprising two connection terminals for connecting the assembly to an external current-sense loop, each connection terminal comprising a spring-force connector.

14. The temperature-sensing and transmitting assembly of claim 1 wherein the programmable transmitter comprises a processor chip having circuitry to correct the signal provided by the temperature sensor, a nonvolatile memory to store correction parameters used by the processor chip, and at least two bus terminals adapted to couple to an external programming bus and adapted to receive therefrom signals that cause one or more correction parameters to be stored in said nonvolatile memory, wherein the assembly further comprises:
at least two connectors to receive an external data programming bus, the at least two connectors being coupled to respective bus terminals of the processor chip, and
a second nonvolatile memory, separate from the processor chip, having at least two bus terminals adapted to couple to an external programming bus to receive signals and adapted to receive therefrom signals that cause the storage of data in the second nonvolatile memory, wherein the bus terminals of the second nonvolatile memory are coupled to the at least two electrical connectors.

15. The temperature-sensing and transmitting assembly of claim 14 wherein the first and second nonvolatile memories are integrated together as one nonvolatile memory.

16. The temperature-sensing and transmitting assembly of claim 1 wherein the programmable transmitter comprises a processor chip having circuitry to correct the signal provided by the temperature sensor, a nonvolatile memory to store correction parameters used by the processor chip, and at least two bus terminals adapted to couple to an external programming bus and adapted to receive therefrom signals that cause one or more correction parameters to be stored in said nonvolatile memory, wherein the assembly further comprises:
a programming jack having at least one connector to receive an external data programming bus, the at least one connector being coupled to a respective bus terminal of the processor chip.

17. A temperature sensor unit comprising:
a housing having at least one aperture; and
a temperature-sensing and transmitting assembly according to claim 1; and
wherein a first portion of the temperature-sensing and transmitting assembly is disposed in the housing and a second portion of the temperature-sensing and transmitting assembly is disposed through the at least one aperture; and
wherein the temperature sensor of the assembly is disposed outside of the housing.

18. The temperature sensor unit of claim 17 wherein the housing comprises a DIN Form B compliant housing.

19. The temperature sensor unit of claim 18 wherein a hinged door is disposed next to the at least one aperture, the hinged door having a closed position that causes the least one aperture to have a first area, and an open position that causes the aperture to have a second area that is larger than the first area.

20. The temperature sensor unit of claim 17 wherein the housing includes a base and a top adapted to be separable from the base, the top having a front surface facing away from the base when the top is attached to the base, and a back surface facing toward the base when the top is attached to the base;
wherein the base comprises one or more support structures adapted to hold a portion of the temperature-sensing and transmitting assembly within a first area of the base; and
wherein the top further comprises a second aperture adapted to expose at least a portion of the first area for viewing when the top is attached to the base.

21. A housing suitable for DIN Form B housing applications, the housing comprising:
a base having a back surface, a round side surface attached to the back surface, and an open top surface, the round side surface having a diameter that conforms to DIN Form B specifications;
a top adapted to be attached to the base to cover the base's open top surface;
a first aperture formed in the back surface of the base, the aperture having a center location that conforms to DIN Form B specifications; and
a hinged door formed in the back surface of the base and adjacent to the first aperture, the hinged door having a closed position adapted to cause the first aperture to have a diameter and a first area that conform to DIN Form B specifications, and an open position adapted to cause the first aperture to have a second area that is larger than the first area.

22. The housing of claim 21, wherein the top has a front surface that faces away from the base when the top is attached to the base, and a back surface that faces toward the base when the top is attached to the base;
   wherein the base comprises one or more support structures attached to the base's back surface and adapted to hold at least a portion of an electrical component within a first area of the base; and
   wherein the top further comprises a window disposed at the front surface of the top and positioned to allow at least a portion of said first area to be viewed when the top is attached to the base.

23. The housing of claim 22, wherein the electrical component comprises a temperature-sensing and transmitting assembly.

24. The housing of claim 21, further comprising:
   one or more support structures attached to the base's back surface and adapted to hold at least a portion of an electrical component within a first area of the base;
   a second aperture disposed at the front surface of the top and positioned to allow access to a first portion of the first area, the second aperture being offset from the center point of the top's front surface; and
   a third aperture disposed at the front surface of the top and positioned to allow access to a second portion of the first area, the third aperture being offset from the center point of the top's front surface.

25. The housing of claim 24 further comprising a hinged lid attached to the top, the hinged lid having a closed position that covers the second aperture and an open position that exposes the second aperture.

26. The housing of claim 24, wherein the electrical component comprises a temperature-sensing and transmitting assembly.

27. The housing of claim 21 further comprising a second aperture disposed at the front surface of the top and positioned substantially about the center point of the top's front surface, the second aperture having a dimension that is larger than the DIN Form B specification for the diameter of the first aperture.

28. A temperature-sensor housing comprising:
   a base having a back surface, a plurality of side surfaces attached to the back surface, and an open top surface;
   a top adapted to be attached to the base to cover the base's open top surface; the top having a front surface that faces away from the base when the top is attached to the base, and a back surface that faces toward the base when the top is attached to the base;
   one or more support structures attached to the base's back surface and adapted to hold at least a portion of an electrical component within a first area of the base;
   a window disposed at the front surface of the top and positioned to allow at least a portion of said first area to be viewed when the top is attached to the base;
   a gap formed between a side surface of the base and a portion of the top when the top is attached to the base; and
   a first aperture formed through the back surface of the base and a second aperture formed through the front and back surfaces of the top, wherein the first aperture is exposed by the second aperture when the top is attached to the base.

29. The temperature-sensor housing of claim 28, further comprising:
   a transmitter section disposed within the first area of the base for the electrical component; and
   a temperature sensor electrically coupled to the transmitter section by an electrical connector, wherein a portion of the electrical connector passes through the gap.

30. A temperature-sensor housing comprising:
   a base having a back surface, a plurality of side surfaces attached to the back surface, a first mating edge disposed on one of the side surfaces, and an open top surface;
   a top connected to the base by a hinge to cover the base's open top surface, the top surface having a second mating edge for engagement with the first mating edge of the base, the hinge allowing the top to pivot between a closed position where the first and second mating edges are engaged and an open position where the first and second mating edges are disengaged, the top having a front surface that faces away from the base when the top is in the closed position, and a back surface that faces toward the base when the top is in the closed position;
   one or more support structures attached to the base's back surface and adapted to hold at least a portion of an electrical component within a first area of the base;
   a first aperture disposed at the front surface of the top, formed through to the back surface of the top, and positioned to allow access to a first portion of the first area;
   a second aperture disposed at the front surface of the top, formed through to the back surface of the top, and positioned to allow access to a second portion of the first area; and
   a hinged lid attached to the top, the hinged lid having a closed position that covers the first aperture at the front surface of the top and an open position that exposes the first aperture.

31. The temperature-sensor housing of claim 30, further comprising:
   a gap formed between a side surface of the base and a portion of the top when the top is in the closed position;
   a transmitter section disposed within the first area of the base for the electrical component; and
   a temperature sensor electrically coupled to the transmitter section by an electrical connector, wherein a portion of the electrical connector passes through the gap.

32. The temperature-sensor housing of claim 30, further comprising a third aperture formed through the back surface of the base and a fourth aperture formed through the front and back surfaces of the top, wherein the third aperture is exposed by the fourth aperture when the top is in its closed position.

33. A temperature-sensor housing comprising:
   a base having a back surface, a plurality of side surfaces attached to the back surface, a first mating edge disposed on one of the side surfaces, and an open top surface;
   a top connected to the base by a hinge to cover the base's open top surface, the top surface having a second mating edge for engagement with the first mating edge of the base, the hinge allowing the top to pivot between a closed position where the first and second mating edges are engaged and an open position where the first and second mating edges are disengaged, the top having a front surface that faces away from the base when the top is in the closed position, and a back surface that faces toward the base when the top is in the closed position;
   one or more support structures attached to the base's back surface and adapted to hold at least a portion of an electrical component within a first area of the base;
   a first aperture disposed at the front surface of the top, formed through to the back surface of the top, and positioned to allow access to a first portion of the first area;
   a second aperture disposed at the front surface of the top, formed through to the back surface of the top, and positioned to allow access to a second portion of the first area; and a third aperture formed through the back surface of the base and a fourth aperture formed through the front and back surfaces of the top, wherein the third aperture is exposed by the fourth aperture when the top is in its closed position.

34. The temperature-sensor housing of claim 33, further comprising:
   a gap formed between a side surface of the base and a portion of the top when the top is in the closed position;
   a transmitter section disposed within the first area of the base for the electrical component; and
   a temperature sensor electrically coupled to the transmitter section by an electrical connector, wherein a portion of the electrical connector passes through the gap.

\* \* \* \* \*